US 11,365,132 B2

(12) United States Patent
McConkey et al.

(10) Patent No.: US 11,365,132 B2
(45) Date of Patent: Jun. 21, 2022

(54) CONTROL VALVE AND CONTROL METHOD FOR A WATER TREATMENT SYSTEM, WATER SOFTENER OR FILTER

(71) Applicant: KINETICO INCORPORATED, Newbury, OH (US)

(72) Inventors: Christopher McConkey, Middlefield, OH (US); Christopher Hansen, Newbury, OH (US); Steven Hoopes, Warren, OH (US); Keith Brown, Solon, OH (US); Evan A. Gordon, Canton, OH (US); Matthew D. Kitzmiller, Middlefield, OH (US)

(73) Assignee: KINETICO INCORPORATED, Newbury, OH (US)

( * ) Notice: Subject to any disclaimer, the term of this patent is extended or adjusted under 35 U.S.C. 154(b) by 946 days.

(21) Appl. No.: 16/061,014

(22) PCT Filed: Dec. 22, 2016

(86) PCT No.: PCT/US2016/068422
§ 371 (c)(1),
(2) Date: Jun. 11, 2018

(87) PCT Pub. No.: WO2017/117026
PCT Pub. Date: Jul. 6, 2017

(65) Prior Publication Data
US 2018/0354812 A1 Dec. 13, 2018

Related U.S. Application Data

(60) Provisional application No. 62/271,803, filed on Dec. 28, 2015.

(51) Int. Cl.
*C02F 1/00* (2006.01)
*C02F 1/42* (2006.01)
*B01J 49/75* (2017.01)
*B01J 49/85* (2017.01)

(52) U.S. Cl.
CPC ............... *C02F 1/008* (2013.01); *B01J 49/75* (2017.01); *B01J 49/85* (2017.01); *C02F 1/42* (2013.01);
(Continued)

(58) Field of Classification Search
None
See application file for complete search history.

(56) References Cited

U.S. PATENT DOCUMENTS 3,891,552 A 6/1975 Prior et al.
4,275,448 A 6/1981 Le Dall
(Continued)

FOREIGN PATENT DOCUMENTS

CN 104061345 A 9/2014
CN 203926916 U 11/2014
(Continued)

OTHER PUBLICATIONS

PCT/US16/68422 International Search Report and Written Opinion dated Feb. 25, 2017.

*Primary Examiner* — Richard C Gurtowski
(74) *Attorney, Agent, or Firm* — Tarolli, Sundheim, Covell & Tummino LLP

(57) ABSTRACT

A control system for a water treatment apparatus that includes a control valve assembly having a servo chamber in which a stationary port defining signal ports is located. A regeneration control disc sealingly engages and rotates on a planar surface of the port disc and selectively communicates fluid signals to water pressure operated components within the control valve. An electric motor located in a dry chamber is operatively coupled to the regeneration control disc and rotates the disc during a regeneration cycle. An encoder coupled to the control disc monitors its position and movement. A turbine assembly monitors water treated or to be
(Continued)

treated and is electronically coupled to a regeneration controller. A sensor emits pulses related to rotation of the usage turbine and communicates these pulses to the controller which uses this information to determine when a regeneration is needed whereupon the drive motor is appropriately energized.

25 Claims, 24 Drawing Sheets

(52) U.S. Cl.
CPC .. *C02F 2201/005* (2013.01); *C02F 2209/008* (2013.01); *C02F 2209/40* (2013.01); *C02F 2209/44* (2013.01); *C02F 2303/16* (2013.01)

(56) References Cited

U.S. PATENT DOCUMENTS

| | | |
|---|---|---|
| 4,298,025 A | 11/1981 | Prior et al. |
| 4,427,549 A | 1/1984 | Brown et al. |
| 5,490,932 A | 2/1996 | Hansen et al. |
| 6,214,214 B1 | 4/2001 | Hansen et al. |
| 6,456,202 B2 | 9/2002 | Johannsen et al. |
| 7,373,949 B2 | 5/2008 | Park |
| 8,535,539 B2 | 9/2013 | Chandler, Jr. |
| 9,452,942 B2 | 9/2016 | Kovach et al. |
| 9,486,801 B2 | 11/2016 | Park et al. |
| 2007/0045191 A1 | 3/2007 | Jeong |
| 2007/0215531 A1* | 9/2007 | Wawrla ............... C02F 1/003 210/101 |
| 2014/0299550 A1 | 10/2014 | Kovach et al. |

FOREIGN PATENT DOCUMENTS

| | | |
|---|---|---|
| CN | 203948712 U | 11/2014 |
| EP | 184773 | 6/1986 |
| WO | 2006083504 | 8/2006 |
| WO | 2009133251 | 11/2009 |

* cited by examiner

CONTROL VALVE AND CONTROL METHOD FOR A WATER TREATMENT SYSTEM, WATER SOFTENER OR FILTER

CROSS REFERENCES TO RELATED APPLICATIONS

This application filed under 35 U.S.C § 371 is a national phase application of International Application Serial Number PCT/US2016/068422 filed Dec. 22, 2016, which claims priority to U.S. Provisional Application 62/271,803, filed Dec. 28, 2015.

TECHNICAL FIELD

The present invention relates generally to water treatment and, in particular, to an improved control system and control device for controlling a fluid treatment apparatus.

BACKGROUND OF THE INVENTION

U.S. Pat. Nos. 3,891,552, 4,298,025, 4,427,549, 5,490,932, and 6,214,214 which are owned by the present assignee, show various versions of a non electric hydraulically driven and controlled water softener or water filter control valve. In both cases they have been designed to operate in a "Twin Tank" configuration. That is, one media vessel in Service, and one media tank in Standby mode. These units by virtue of the design features built into the control valve have enabled them to possess operational benefits unlike similar products currently in the Market. Examples include: an uninterrupted supply of treated water, counter-current regeneration, high efficiency by metered usage of the water, and regeneration with treated water to name a few.

The disclosed control valves control which of the tanks is on-line and controls the regeneration sequence of an exhausted tank. The quantity of water treated by a given tank is monitored by a mechanism that includes a water usage turbine driven by water as it leaves the on-line media tank. Revolutions of the turbine are carried up through a gear train and ratchet assembly. Said predetermined number of revolutions correspond with a predetermined quantity of treated water, initiating a regeneration sequence which places the standby tank on-line and isolates the exhausted tank. A second turbine, operatively connected to a regeneration sequence control element (in the form of a disk) is rotated by a stream of water that is activated at the beginning of the regeneration cycle. The stream of water physically drives the regeneration control disk (via the turbine and associated drive train) through its sequence. As described in U.S. Pat. No. 4,298,025, the rotation of the control disc against a ceramic disc acts as the distributor of either pressurized or vent signals to the hydraulic valves that make up the total control valve. This control disc and ceramic interface has been improved and enhanced over years of experience and therefore makes up the "heart" of a very reliable control valve. As described above, the frequency of regeneration of the water softener or filter system is determined by the usage turbine which directly measures the quantity of fluid treated by a given tank.

This type of valve has proven to be very reliable and has been successfully sold in many markets for over 40 years. As reliable as this type of valve has proven to be, there is room for some improvement in several areas.

These valves use the flow of a relatively small stream of water to turn a turbine and associated gear train to rotate a control disc to drive the system through a regeneration. After driving this turbine for regeneration the water is then sent to drain. While simple and reliable, in today's environmental climate of water scarcity, even small amounts of water that are perceived to be wasted can be a negative.

The use of the turbine to drive the regeneration requires a dedicated valve which needs to be opened and closed to start and stop the flow of drive water. This valve can be eliminated if the drive water is eliminated, along with a dedicated nozzle, flow control, associated gearing, turbine and control disc drive pawl.

Also the water treatment systems described in the patents listed above, require a trained service technician to make adjustments to either the regeneration frequency or the regeneration timing and/or sequence of operations.

Today's consumer is becoming accustomed to being able to interface with his appliances with his/her smart device like a cell phone, tablet or lap top computer and to also have data on the appliances operation available on these devices for review and analysis. The consumer is also showing interest in remote monitoring and controlling of devices.

SUMMARY OF THE INVENTION

The present invention provides a new and an improved apparatus and method for controlling a water treatment system having at least one treatment tank that requires regeneration. The apparatus includes a control valve assembly having a housing that, among other components, encloses a servo-control system for effecting regeneration of an exhausted tank. According to the invention, the control valve housing includes a servo control chamber in which a stationary port disc is located. The stationary port disc defines signal ports for selectively communicating pressurized water or the ambient drain to fluid pressure operated components housed within the valve housing.

A regeneration control disc is rotatable in a rotational plane atop the port disc. The rotation of the regeneration control disc selectively communicates a signal port with pressurized water or the ambient drain. The rotatable regeneration control disc is biased into sealing engagement with the port disc. An encoder wheel is operatively coupled to the regeneration control disc and monitors rotation and the position of the regeneration control disc. A sensor monitors movement in the encoder or encoder wheel. In the illustrated embodiment, the sensor is an optical sensor. An electric drive motor is operatively coupled to the regeneration control disc so that energization of the electric motor produces attendant rotation in the regeneration control disc.

A water usage turbine for monitoring the quantity of water treated by the treatment system is operatively mounted in the valve housing and is rotated by water that is treated or about to be treated by the treatment tank. A sensor for monitoring the rotation of the usage turbine is operative to produce signals in response to the rotation of the water usage turbine. In the illustrated embodiment, the sensor is a hall effect sensor. A regeneration controller is electrically coupled to the drive motor and is operative to receive signals from the water usage turbine sensor and uses these signals from the water usage turbine sensor to determine when regeneration of a treatment tank forming part of the water treatment system requires regeneration. The controller is further operative to control energization of the electric motor to cause rotation of the control disc in order to effect a regeneration cycle.

In one illustrated embodiment, the electric motor is disposed within a dry chamber that is located in the valve housing below a rotational plane defined by the regeneration control disc.

In another illustrated embodiment, the drive motor is located in a housing portion that is located above a rotational plane defined by the regeneration control disc.

According to a feature of the invention, provision is made for manually rotating the regeneration control disc. This feature is useful if the homeowner wants to step through a regeneration cycle manually, or to rotate the regeneration control disc in the event of a power failure. According to this feature, the electric motor is coupled to the regeneration control disc through a pinion and a pinion shaft assembly, which includes a tapered bushing clutch that interconnects shaft portions forming part of a pinion shaft assembly. The clutch assembly is configured such that applying pressure to one shaft portion of the pinion shaft assembly produces a separating movement in the tapered bushing clutch, allowing relative rotation between the shaft portions. This feature further includes an externally actuatable member which produces the separating movement between the shaft portions when the actuator member is pressed. The actuator member is engageable with the regeneration control disc when pressed, so that rotation of the actuator member produces rotation in the regeneration control disc.

According to another feature of the invention, the system controller is remotely mounted from the control valve assembly and, in one embodiment, is connected to the control valve by a cable. In another embodiment, the regeneration controller is mounted in a dry compartment forming part of the control valve assembly.

According to another embodiment, the remotely mounted controller may be electronically coupled to the control valve device wirelessly, i.e., by Wi-Fi or Bluetooth connection.

According to another feature of the invention, the regeneration controller may be wirelessly connected to another device such as a computer or smart phone, by which the controller can be programmed, monitored or from which data can be downloaded onto the wirelessly connected device.

According to the invention, a method for adapting or modifying a prior art control valve assembly, such as the control valve disclosed in U.S. Pat. Nos. 3,891,552; 4,298,025; 4,427,549 and 6,214,214. According to the invention, a prior art control valve of the type disclosed in the above-referenced patents, has a water pressure operated servo control system, a regeneration turbine chamber that normally encloses a regeneration drive turbine and nozzle and a regeneration control disc that is operatively connected to the regeneration drive turbine, such that rotation of the drive turbine produces rotation in the regeneration control disc.

According to the disclosed method of the present invention, the regeneration turbine chamber is isolated from sources of water, thus creating a dry chamber. A regeneration control disc having peripheral gear teeth is rotatably mounted above a port disc that defines a plurality of fluid signal ports for communicating either an ambient drain or pressurized water with fluid pressure operated components within the valve housing. The regeneration control disc is biased in to sealing engagement with the port disc. An electric motor for driving the regeneration control disc is mounted within the now empty and sealed turbine chamber of the prior art valve housing (the turbine, and associated gearing are removed and the fluid nozzle for producing rotation in the turbine is either rendered inoperative or removed). The regeneration control disc is operatively connected to an encoder wheel located above the control disc in a "dry" compartment that is sealed from the servo-control chamber and where the regeneration control disc and port disc are located. A water usage turbine, which may be similar to the turbine used in a prior art control valve, is rotatably mounted within the housing. The usage turbine may include a magnet which interacts with a sensor (such as a hall effect sensor) that senses rotation of the turbine. In an illustrated embodiment, rotation of the turbine produces magnetic pulses that are detected by the detector. The encoder sensor, water usage turbine sensor and electric drive motor are electrically coupled to the regeneration controller which, as indicated above, may be remotely located or mounted within the valve housing in a dry chamber.

According to a feature of the invention, a drain passage, which normally communicates with the turbine chamber, is blocked or rerouted by either molding new structure in the prior art valve housing and/or changing gasket interfaces between individual layer portions forming part of the overall multi-level housing.

The present invention provides a new and improved hydraulically operated control valve and method for controlling used in water treatment. The existing valve presently measures the volume of water processed to trigger some type of required cleaning or media regeneration and uses a small dedicated stream of water to create the rotational energy needed to rotate a control disc that provides the cleaning or regeneration process. The present invention includes the use of a small electric motor to provide the rotation of a new or existing control disc, along with the associated electronic controls to allow the control disc to stop in various positions for set amounts of time needed in the cleaning or regeneration process. To do this there will be some type of position indicating device such as an optical or magnetic encoder directly linked to the control disc for communication.

In one embodiment the electric motor would be positioned in a dry zone and interface through a sealed shaft to provide the rotation to the control disc in its water pressured location. One such dry zone could be created in the present regeneration chamber where the regeneration turbine and gear train exist today. That chamber can be made dry by eliminating the turbine drive water and rerouting the control disc vent. In another embodiment, the dry zone could be created above or below the present control disc with the motor and position control all being located in that area.

The existing valve uses multiple different control disc designs and gear trains to achieve different regeneration sequences, times, and tank configurations (parallel or alternating service). The present invention can make all those adjustments through simple program entries. A new control disc can be created where the spacing of the pressure/venting operations of the valve sequences can be spread out to allow greater tolerance of angular positioning required to achieve the various valve positions and related overall control valve functions. In the existing valve, that spacing is dictated by the desired time percentage of the function as it relates to the total regeneration time created by the turbine movement carried up through the gear train. In some cases that produces function changes that happen in relatively short angular movements of the control disc. Now in the present invention with the motor drive and electronic controls the angular position of those function changes has no required relationship to other function changes, allowing them to be more equally spaced throughout the regeneration.

The water volume used to trigger the regenerations, previously measured mechanically is now measured electronically. In one embodiment, volume metering will be performed by an electronic Hall effect meter turbine, and the accumulation of the metered gallons will take place in the electronics. This will allow for the elimination of the associated gear train, pawls, meter discs, etc. that today translates the rotation of the impulse turbine into a "start regeneration" signal. Today's mechanical designs, as shown in U.S. Pat. No. 4,298,025 provide a number of selectable volumes to initiate a regeneration, whereas the electronic metering and motor controlled movement in the present invention provide a regeneration signal at a more precise, predetermined volume making the softener more efficient. Alternately, metering could be performed by commercially available electronic turbine meters or using existing meter turbines with magnets. This will allow for the elimination of the associated gear train, pawls, meter discs as above.

The present invention would include various means of interfacing with the electronic controls such as wireless Bluetooth, WiFi or other methods that would allow for all communication with the controls to take place from a smart device such as smart phone or tablet. A related type of control applied to a water softener is covered in U.S. Pat. No. 6,456,202. Besides using local communication with a Bluetooth style radio signal, a WiFi type connections could be made with the local WiFi device and remote access could be established to both monitor the softener's operation and even control its operation or adjust settings like length of regeneration steps or volumes processed between regenerations. Water usage patterns and regeneration frequencies could also be monitored.

Therefore this invention brings a means of maintaining the reliable and proven control disc-ceramic disc interface as a means of sending fluidic signals to control the valve's operations, eliminating a source of wasted water, eliminating parts, and allowing a means of easier and possibly remote control adjustment and a means of monitoring various operating data on a smart device both locally and remotely.

Additional features of the invention will become apparent and a fuller understanding obtained by reading the following detailed description made in connection with the accompanying drawings.

BRIEF DESCRIPTION OF THE DRAWINGS

The foregoing and other features and advantages of the present invention will become apparent to those skilled in the art to which the present invention relates upon reading the following description with reference to the accompanying drawings, in which.

DETAILED DESCRIPTION OF THE INVENTION

U.S. Pat. Nos. 3,891,552, 4,298,025, 5,490,932, 6,214,214, 7,373,949, and 9,315,395 describe in detail the design and operation of the existing hydraulically (water pressure) operated control valve(s) for water treatment applications, such as, but not limited to, water softeners. All of the above listed U.S. patents are hereby incorporated by reference. The present invention is a substantial enhancement and improvement to prior art control valves for water treatment systems.

Figure 1:
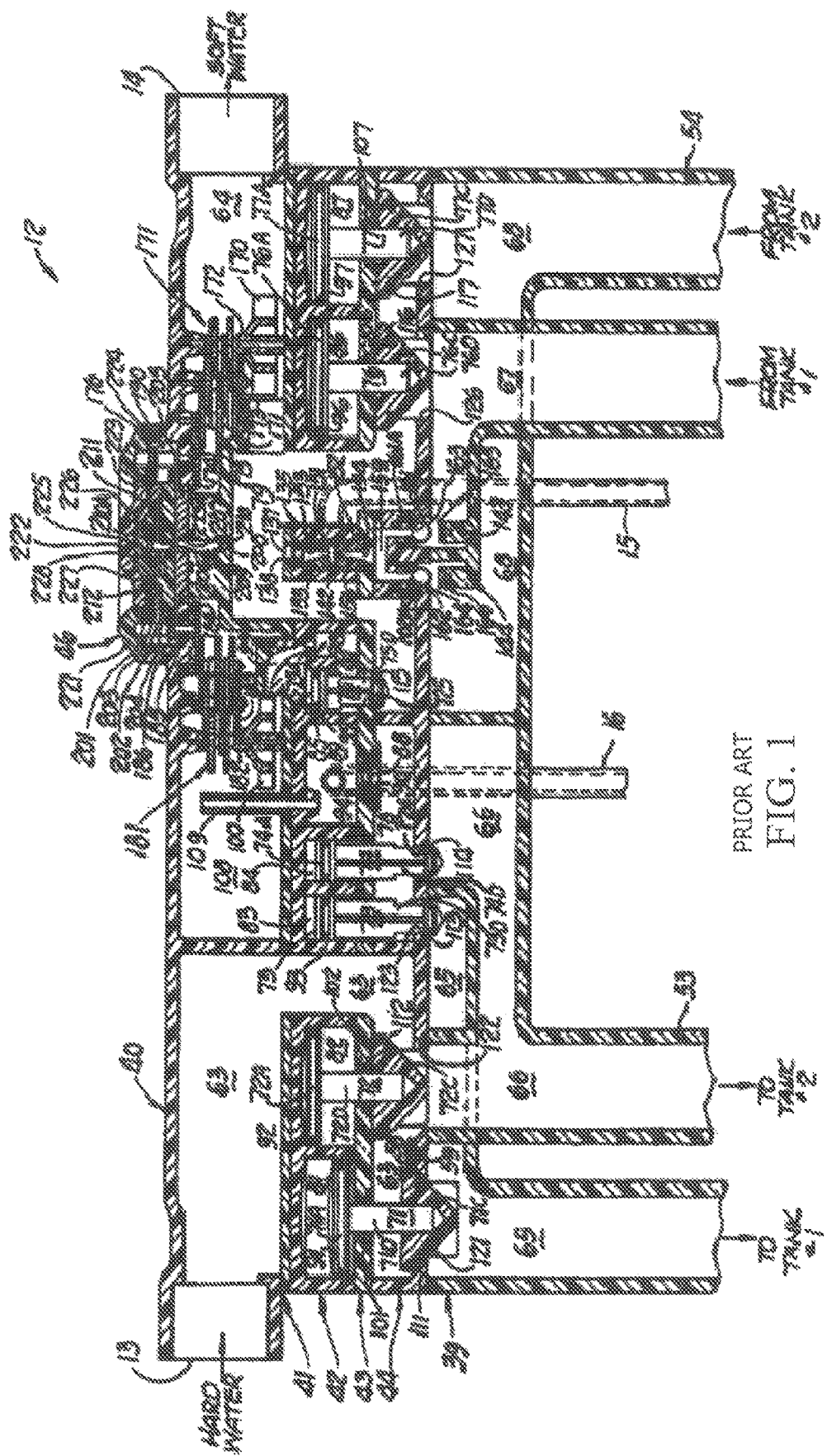
FIG. 1 is a fragmentary, unwrapped sectional view of a prior art control valve.

FIG. 1 is a drawing of a prior art softener control valve disclosed in U.S. Pat. No. 3,891,552, which is hereby incorporated by reference. In particular, FIG. 1 is an exact copy of FIG. 3 that formed part of U.S. Pat. No. 3,891,552. Accordingly, the reference characters shown in the present FIG. 1, are the same reference characters used in the '552 patent and those reference characters are unique to FIG. 1 in this patent application.

The reference characters used in FIGS. 2-25 are unique to those Figures, even though some of them may be the same as the reference characters used in FIG. 1. In the following description, when a reference character is being referred to that is only in FIG. 1, it will be so indicated.

By way of summary, FIG. 1 illustrates the operation of a water softener control valve 12 that is hydraulically (water pressure) operated. This prior art valve, includes a water driven turbine 170 for monitoring the quantity of soft water produced by the control valve 12. The control valve shown in FIG. 1 also includes a regeneration control turbine 100 for driving a regeneration control disc 202. The turbine 170 drives a water usage meter disc 201 which rides atop a regeneration control disc 202.

Further aspects of the operation of the prior art valves of the type disclosed in the above-identified U.S. patents, which are all herein incorporated by reference, will be described in connection with FIGS. 2-4 which, as indicated above, will use reference characters that are unique to the remaining Figures in the patent application and are not related or the same as the reference characters used in FIG. 1.

Figure 2:
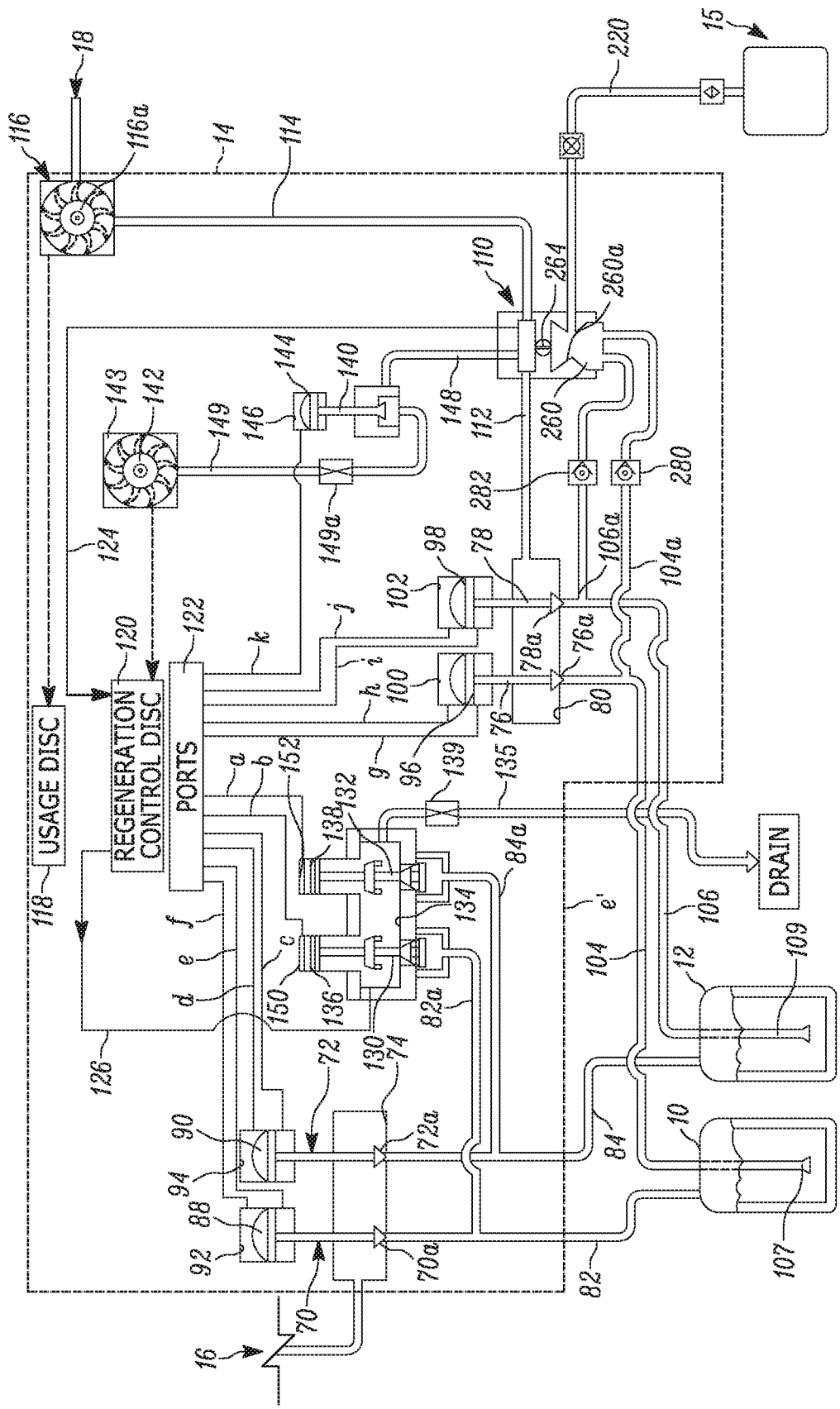
FIG. 2 is a schematic diagram of a prior art valve.

FIG. 2 schematically illustrates the construction and operation of the prior art control valve. FIG. 3 is a sectional view of a top level of the existing valve. Both FIGS. 2 and 3 show the two turbines in use today. Turbine 116 (FIG. 3) meters all the treated water that is produced by the water treatment apparatus or filter. and treatments that The rotary motion of the turbine 116 is transferred through a gear train 283 into the top control area (58a FIG. 3). Referring also to FIG. 4, the rotation of the turbine 116 is transmitted through a ratchet pawl to a usage meter disc 118. As the meter disc rotates relative to the volume of water turbine (116) has seen, periodically the water usage meter disc 118 causes an initial advancement of the regeneration control disc 120 located below it. This initial advancement initiates a regeneration of the water treatment system (i.e., softener) by incrementally rotating the control disc 120 which sends either pressure or vent signals to the signal orifices located in a ceramic port disc 122. These signals operate seven valves in a lower control valve section. The opening and closing of the valves as directed by the fluid signals, directs the flow of a regeneration solution and rinsing water to effect the regeneration on the tank needing it, and to bring a fresh regenerated tank on line. The schematic in FIG. 2 more clearly shows these relationships.

The initial rotation of the regeneration control disc 120 that is effected by the usage meter disc 118 sends a pressure signal to open a control valve 140 (FIG. 2). As this valve opens, a stream of water is sent up through a nozzle 141, which is directed toward the regeneration turbine 142 (FIG. 3). The rotation of this turbine is carried up through a gear train 285 (FIG. 3) into the top control area 58a (FIG. 3), where it is translated by a ratchet pawl into a tooth by tooth rotational movement of the regeneration control disc 120. Whereas the initial rotation of the regeneration control disc 120 is created by the periodic coupling of the usage meter disc 118 with the regeneration control disc 120c, once initiated far enough for the regeneration control valve 140 (FIG. 2) to open, the regeneration control disc is now driven independently by the rotation of the regeneration turbine 142 (FIG. 3). A 180 degree rotation of the regeneration control disc 120 completes a full regeneration of one of the dual tanks of the softener (or a 360 degree rotation would control the regeneration of a single tank water treatment system as described in U.S. Pat. No. 9,452,942. The time required for the control disc to rotate either 180 degrees or 360 degrees is set by the speed of the regeneration turbine and the gear train ratios chosen at assembly. Altering this time by changing gear ratios in the field is complex and requires a skilled technician to accomplish. The volume and velocity of water that is directed toward the regeneration turbine directly affects the speed of the turbine and hence the time of regeneration. Knowing that the water pressure available at the installation site can directly affect the velocity of the water directed toward the turbine, flow control 264 (98 FIG. 1) is included in the prior art design to as effectively as possible keep that flow constant. While effective, this type of elastomeric orifice flow control still allows for variations in the flow velocity over a range of pressures, and hence produces a variation in regeneration times.

Besides the overall regeneration time, another important factor in the regeneration process is the duration of each of the regeneration steps. In the existing design, the design of the specific regeneration control disc depending wall geometry 248 (FIG. 4) is the key to the relationship of the regeneration steps. The radial design and positioning of the transition from the pressurized 249 and drain 251 regions (FIG. 4) is what sets the ratios of the regeneration steps. For example, one regeneration control disc may use 70% of the 180 degree rotation for brine draw and 20% for fast rinse and the remaining 10% for regeneration initiation and other control valve functions and shut off activities. To create a ratio of 60% brine draw and 30% fast rinse and entirely new control disc must be designed, tooled up and produced. Another control disc design would be required to allow the system to end its regeneration in a state where both tanks are in service. (a parallel flow type of treatment system) This allows for a higher flow rate at a lower pressure drop for a majority of the time, a feature that is a benefit in some commercial applications. Another feature as described in U.S. Pat. No. 6,214,214 is a final down-flow fast rinse, a feature useful in some filtration and ion exchange applications. This requires some special lower valves and once again a custom control disc. To change these discs in the field, as with the regeneration control disc gearing, requires a skilled technician.

Figure 5:
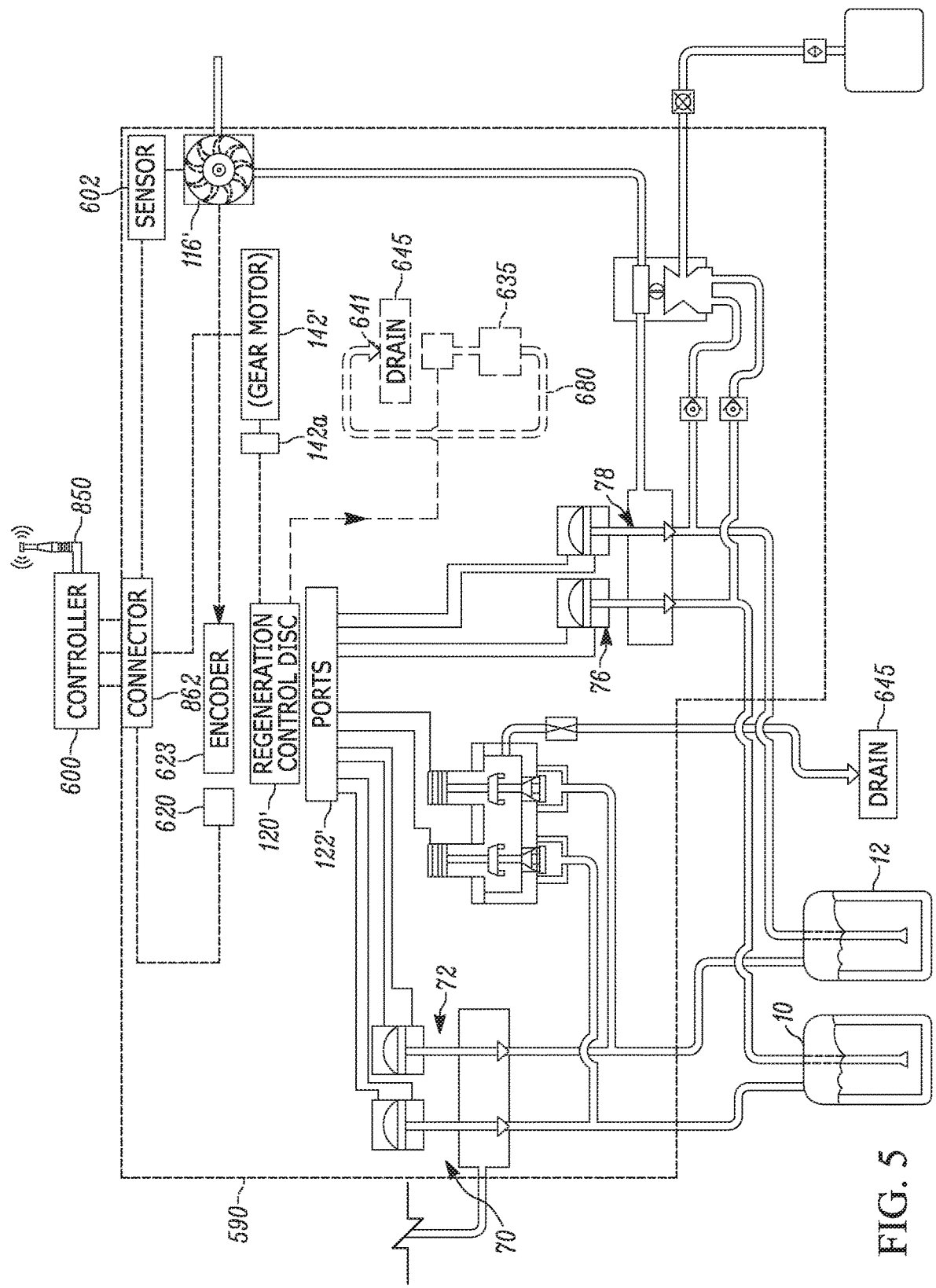
FIG. 5 is a schematic representation of a control valve constructed in accordance with the present invention.

The present invention greatly simplifies several of the adjustments discussed previously. The invention uses a small gear motor to provide the rotary motion needed by the control disc. FIG. 5 schematically illustrates a control valve 590 constructed in accordance with the present invention. As seen in FIG. 5, the control valve 590 of the present invention includes many of the same components used in a prior art valve, schematically shown in FIG. 2. For example, flow control valves 70, 72, 76 and 78 shown in FIG. 2 may be used in the control valve of the present invention.

As indicated above, the valve of the present invention uses electrical and electrically operated components as part of the valve's operation. A regeneration control disc 120' rotates atop a port disc 122' to control the regeneration sequence of an exhausted tank (10, 12). The regeneration control disc 120', however, is rotated by an electrically operated gear or servo motor 142'. With the use of a gear motor 142' to drive the regeneration control disc 120', positive movement in the regeneration control disc 120' is assured whenever the motor 142' is energized. In addition, the regeneration drive motor 142' can be stopped and restarted during a regeneration cycle, to adjust the timing of the steps being performed. The motor 142' is electrically connected to an electrical controller 600 which may be programmable. The amount of treated water discharged by the control module is monitored by a turbine 116'. In accordance with the invention, the rotation of the turbine 116' is monitored by a sensor 602 which may be a Hall effect sensor and is electronically coupled to the controller 600. The controller includes circuitry for monitoring the sensor 602 which may comprise monitoring pulses emitted by the detector 602 in response to the rotation of the turbine 116'.

The controller may be programmed to initiate regeneration when a predetermined number of pulses is detected or exceeded, whereupon the electric motor 142' is energized either continuously or intermittently in order to rotate the regeneration control disc 120' through a regeneration cycle. An encoder 623 is rotatably coupled to the control disc 120' and monitors its position.

Figure 8:
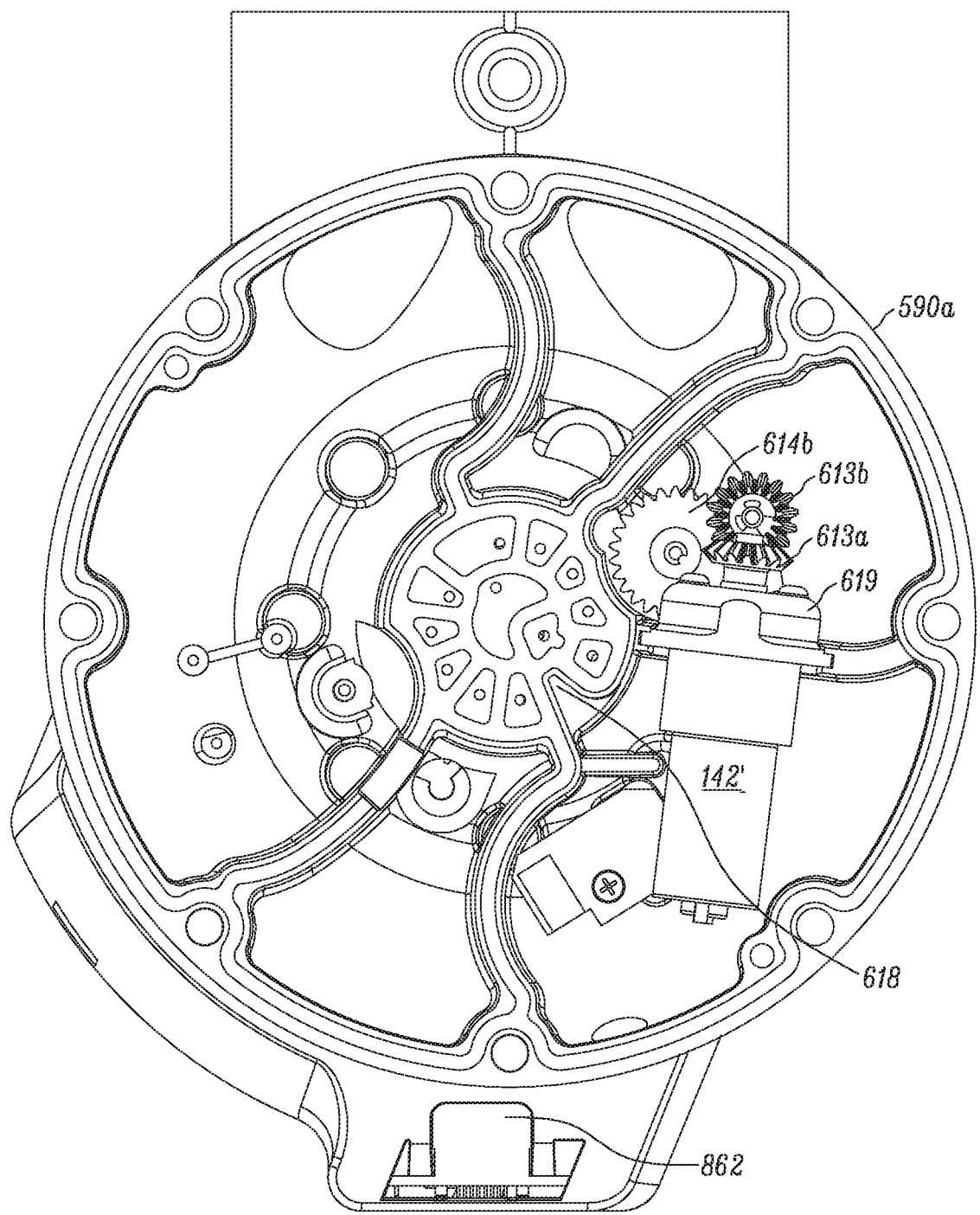
FIG. 8 is a plan view of an interior portion of the control valve shown in FIG. 6.

In the embodiment illustrated in FIG. 5, the controller 600 is located outside the valve housing 590 and is connected to the associated electrical components contained within the valve housing by a cable. As seen in FIG. 5, the cable is attached to a connector 862 (the connector is also shown in FIG. 8). It should be noted here that the regeneration controller 600 can be electronically connected to the associated components in the valve housing via a wireless connection such as Bluetooth or Wi-Fi.

Over the last 10 years significant improvements to the size, power and cost of very small gear motors has taken place due to demand generated from industries such as computer printers, robotics, home appliances, home security, toys and others. The large number of low voltage small and relatively powerful gear motors has made their use in this type of application more reasonable and acceptable. Using one of these gear motors as a source of power, the encoder linked to the control disc 120' can provide radial location information to electronic controls that would provide start and stop signals to the motor. According to the invention, a regeneration control disc 120' can be designed and configured to more evenly spaces out the transition between regeneration steps or regeneration end points of alternating or parallel flow allowing for ease of positioning and eliminating tight tolerances for an exact start and stop position. The timing (the time the motor 142' is energized) of each segment or step would be set in the controls electronically and hence the timing of each step and thereby the timing of the entire regeneration process would be adjustable and controlled by the electronic controls.

Another benefit of the invention is the elimination of the stream of water that drives the prior art regeneration turbine 142 (FIGS. 2 and 3), thereby eliminating a source of wasted water (even if relatively small) and making the system more water efficient. Further parts could be eliminated such as the regeneration turbine 142 (FIG. 3), its related gear train 285 and associated gear shafts (FIG. 3), the regeneration drive ratchet pawl 284 (FIG. 4), its spring 284a (FIG. 4) and the regeneration control poppet valve 140 (FIG. 2). The ceramic port disc 122 no longer needs the outermost holes that fed the open and close (vent) signals to the control valve port 140a (FIG. 2) and in one embodiment of the present invention allows for some of the porting routes used for those signals to be used for other purposes.

Figure 6:
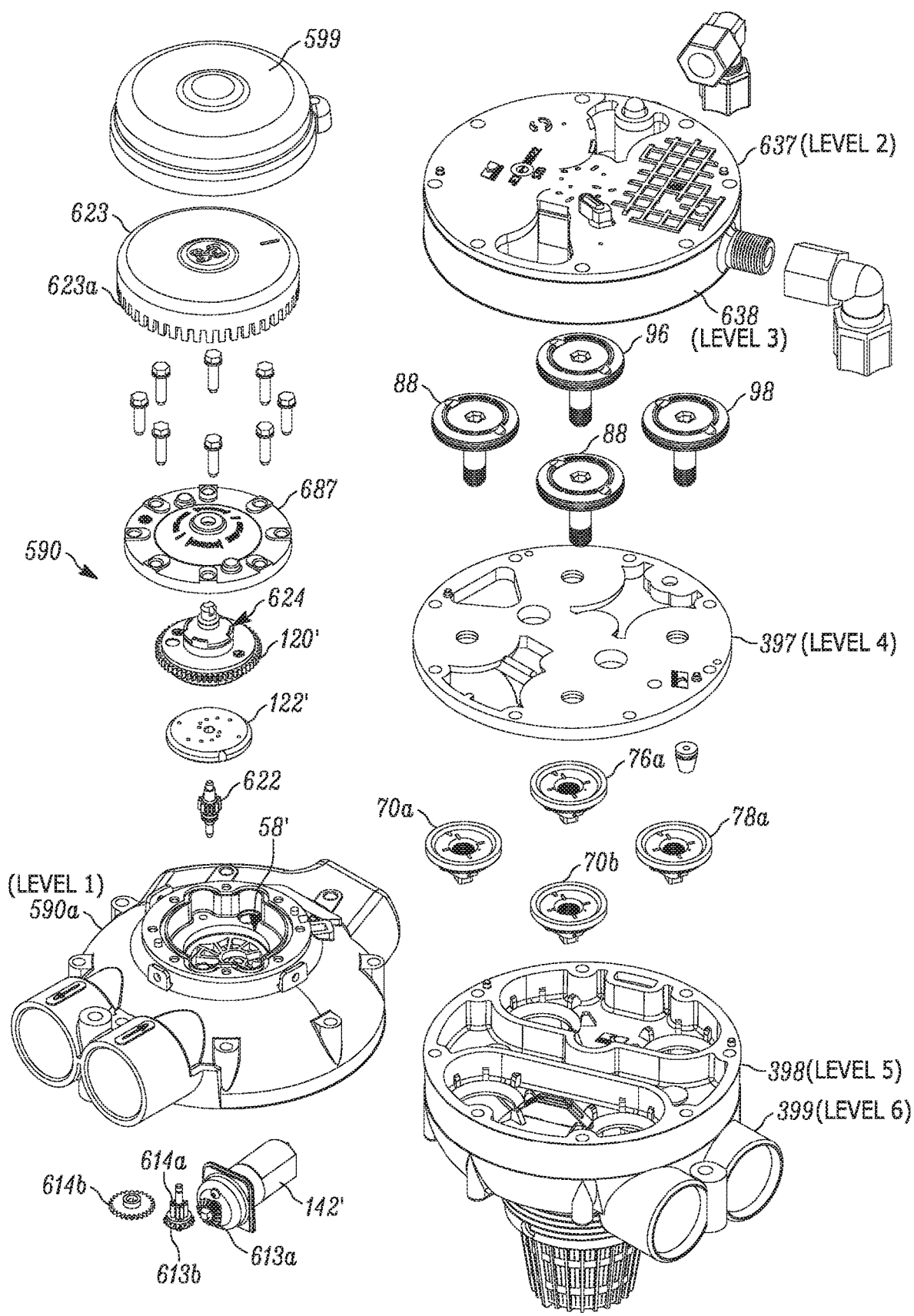
FIG. 6 is an exploded view of a control valve constructed in accordance with the present invention.

Referring in particular to FIGS. 5 and 6, according to the invention, the control valve 590 includes a control valve housing which includes multiple levels that are joined together by a plurality of elongate bolts (not shown). In particular, and referring to FIG. 6, the control valve housing includes four levels that are denoted in FIG. 6 and indicated by the reference characters 590a, 637, 638, 397, 398 and 399. The levels 397, 398 and 399, which are also labeled "level 4", "level 5" and "level 6", respectively, and form part of prior art control valve assemblies that are disclosed in some of the above-identified U.S. patents. As seen best in FIG. 6, a control valve housing portion 590a, which is the uppermost housing portion and is termed "level 1", houses the water usage monitoring apparatus and the regeneration control apparatus which form part of a servo-control system. In particular, the housing 590a encloses a servo control system which mounts a fixed port disc 122' which is preferably constructed of ceramic. The regeneration control disc 120' rotates atop a port disc surface, preferably planar, of the port disc 122' and controls the communication of pressurized water to signal lines a-k (shown in FIG. 2) and the signals of a drain 645 (shown in FIG. 5) as it rotates atop the port disc 122'. As is known, the regeneration control disc 120' is biased into sealing engagement with the port disc 122' by a balance piston 288' and coil spring 286', shown in FIG. 7. The motor 142' is located in a "dry" chamber, defined by the housing 590a and is operatively coupled to the regeneration control disc 120' by gears and pinions 613a, 613b, 614a, 614b, and pinion shaft 622.

The rotational position of the regeneration control disc 120' is monitored by an encoder wheel 623. The regeneration control disc 120' is coupled to the encoder wheel 623 by a coupling 624 (to be described). A cap 687 encloses the regeneration or servo control chamber 58' which is considered a "wet" chamber. The chamber above the cap 687 which houses the encoder wheel 623 is a "dry" chamber and it is enclosed by a cap 599 which may be a snap-fit type cap.

There are several options for how a small gear motor can be used to rotate the control disc. Two such options will be disclosed here but several other options would be obvious to those skilled in the art. The rotary motion of an output shaft/gear 142a of the gear motor 142' can be coupled to the regeneration control disc 120' through spur gears or bevel or miter gears or again those skilled in the art could envision the use of timing belts and pulleys, worm gears or other mechanical motion transmission devices.

Two embodiments to be shown and disclosed will include driving the regeneration control disc 120' from beneath or above the regeneration control disc 120'.

Figure 7:
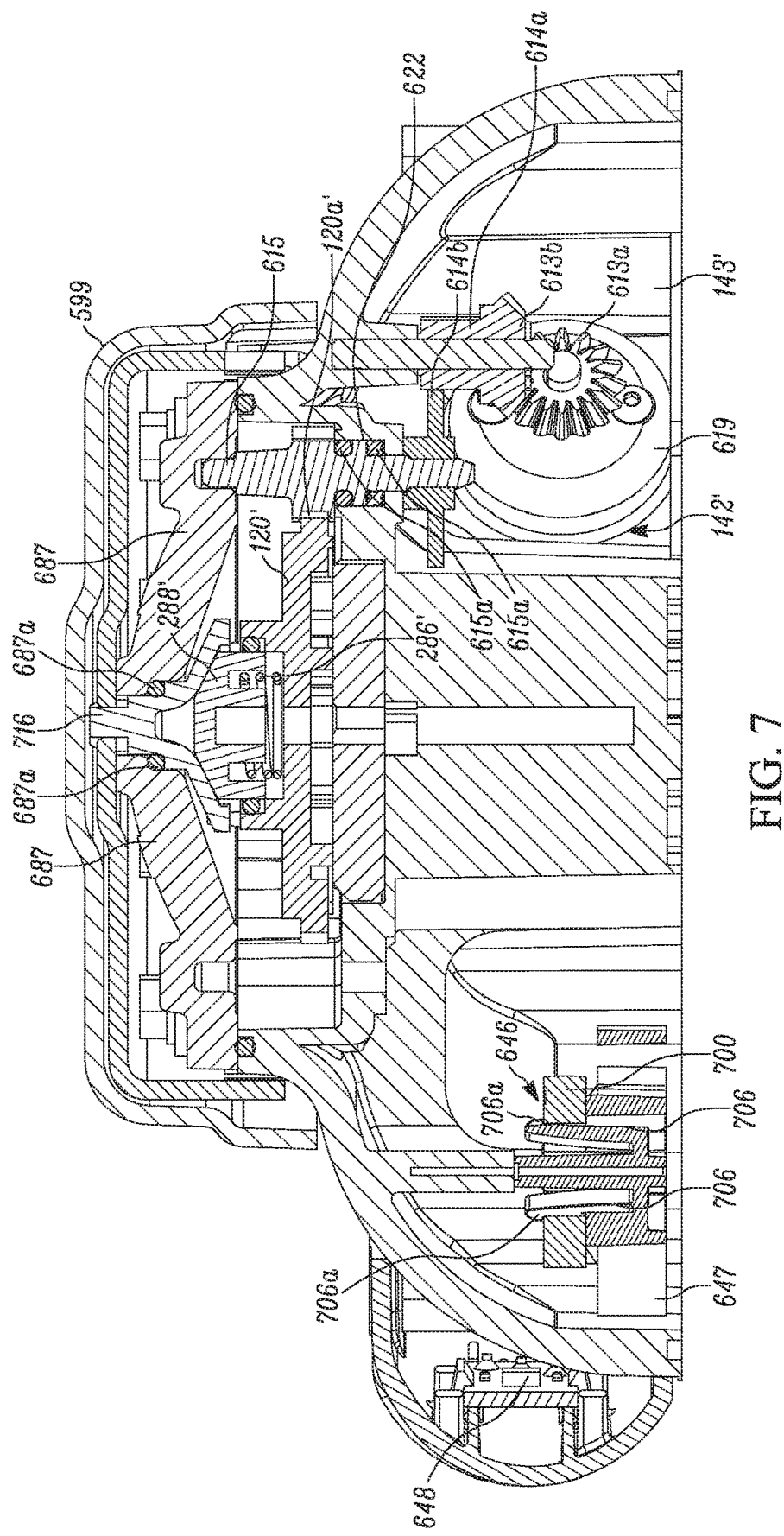
FIG. 7 is fragmentary, cross-sectional view of a top level of the control valve illustrated in FIG. 6, showing a gear motor mounted beneath a regeneration control disc and an interconnecting gearing and encoder as seen from the plane indicated by line 7-7 in FIG. 22.
Figure 10:
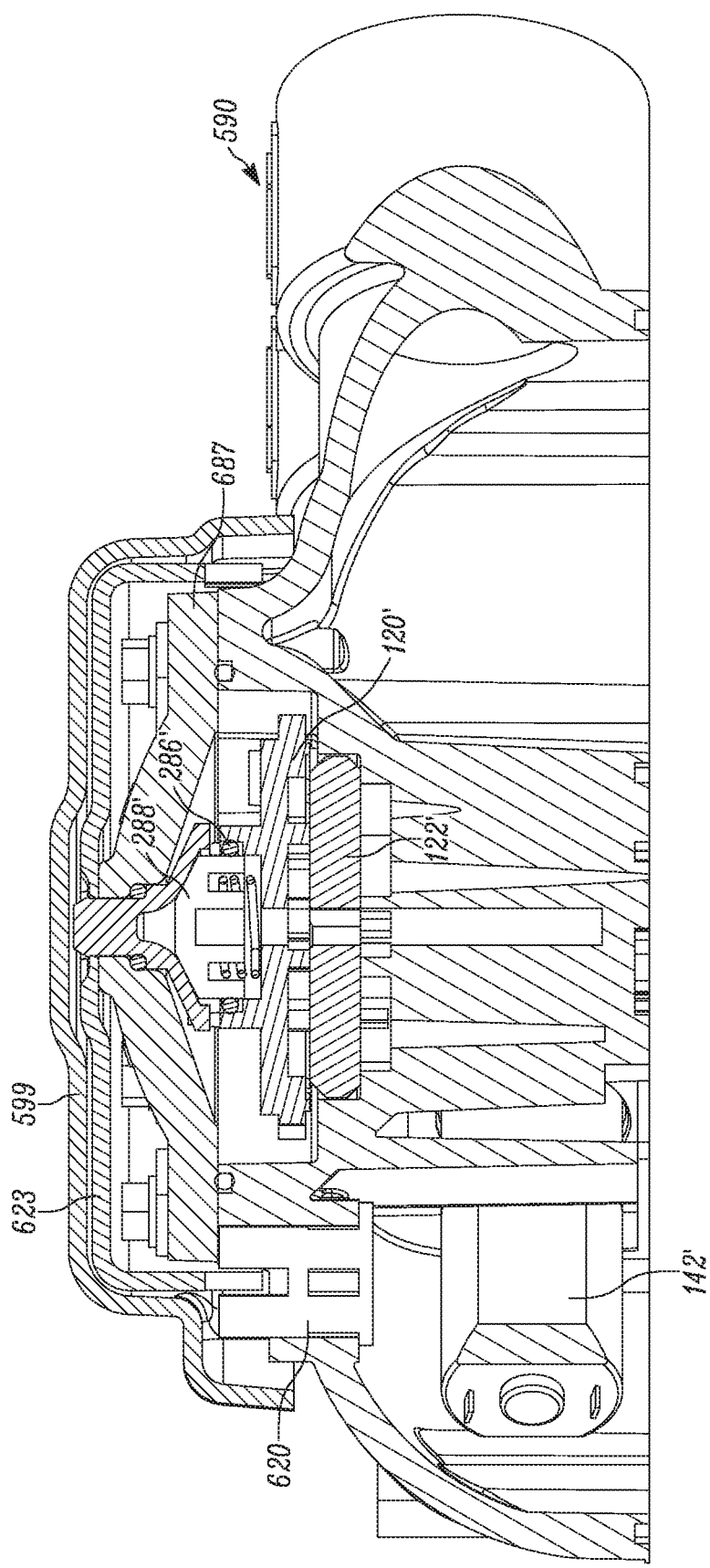
FIG. 10 is another fragmentary sectional view of the control valve showing an encoder reader/encoder interface as seen from the plane indicated by the line 10-10 in FIG. 22.
Figure 11:
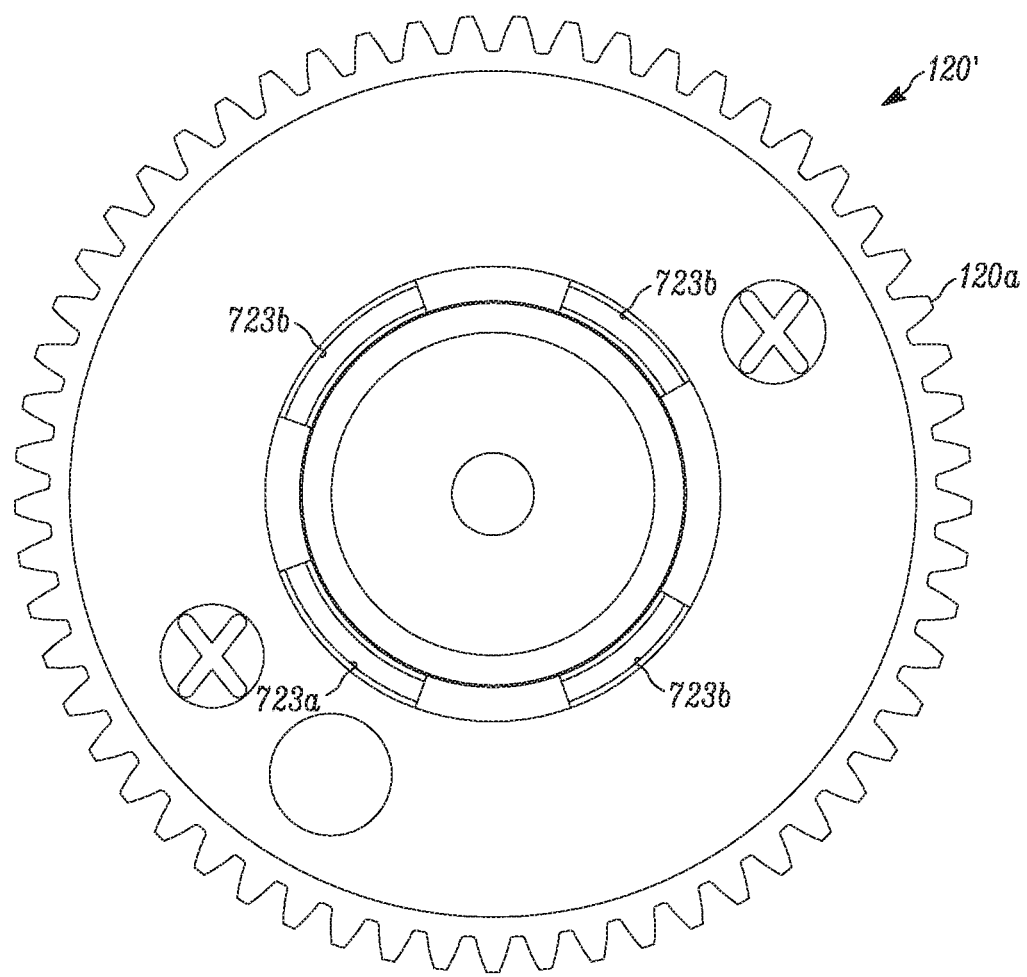
FIG. 11 is a top plan view of a new regeneration control disc forming part of the invention.

In one preferred embodiment, the gear motor 142' is located below the regeneration control disc as shown in FIGS. 7, 8 and 10. In this embodiment the gear motor 142' is mounted horizontally in what was the regeneration chamber 143 (FIG. 3) in the prior art valve and where the previously required regeneration turbine and gear train were mounted. With the elimination of those components, there is room for the gear motor and associated transmitting gears to be located in the chamber marked 143' in FIG. 7. In the prior art construction, this chamber communicates with an ambient drain.

In this embodiment the gear motor 142' mounts to a motor mount bracket 619. The motor mount slides into a support rib opening to position it and to hold it in place. To convert the horizontal rotary motion to the required vertical rotary motion, miter gears 613a, 613b are employed. The receiving bevel gear 613b is made in one piece with a pinion spur gear 614a which meshes with the existing stem gear 614b. That stem gear is pressed fitted onto and keyed to a pinion shaft 615. This pinion shaft is fitted into a new bearing pocket 622 molded into what will be termed a control valve "Level 1" (FIG. 7), where the pinion shaft 615 has dual seals 615a to prevent leakage of water pressure into chamber 143' from the pressurized chamber above. The pinion meshes with gear teeth 120a' (see FIG. 11) that have been added to the regeneration control disc 120' and replaced the ratchet teeth shown as 120a in FIG. 4 on the prior art control disc 120.

Figure 9:
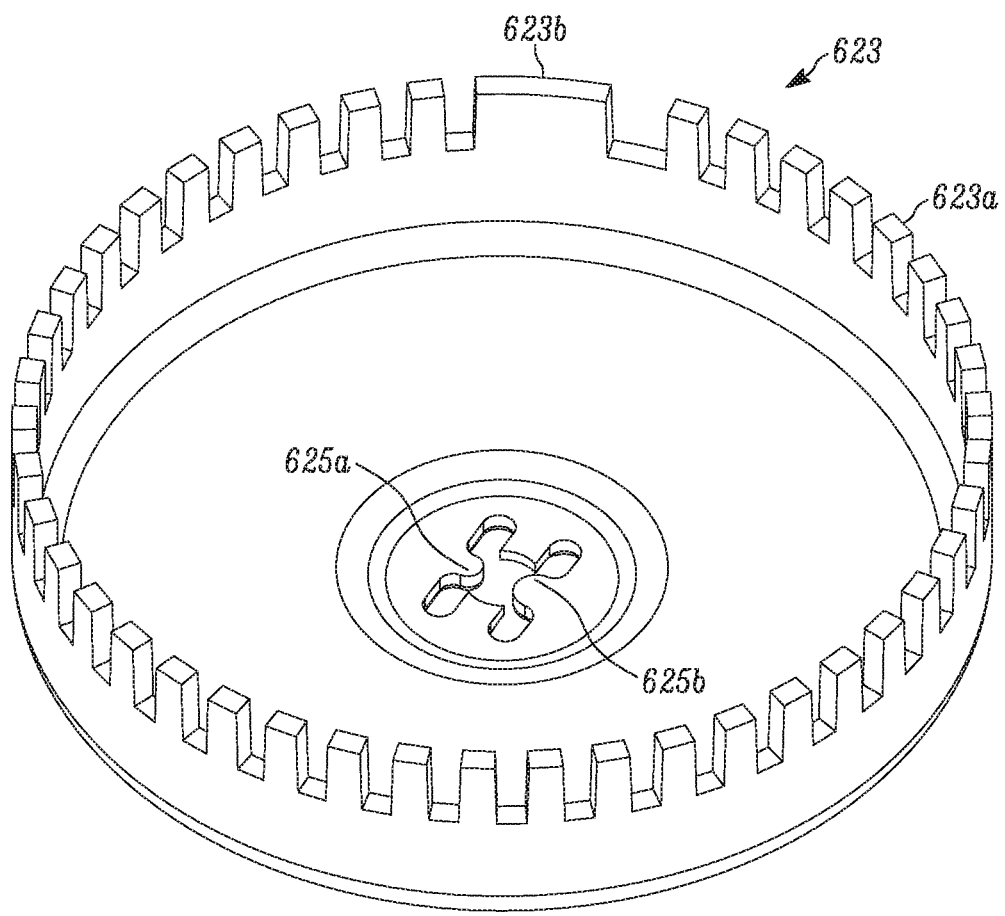
FIG. 9 is a perspective view of an encoder disc or wheel used in at least one embodiment of the present invention.
Figures 12A, 12B:
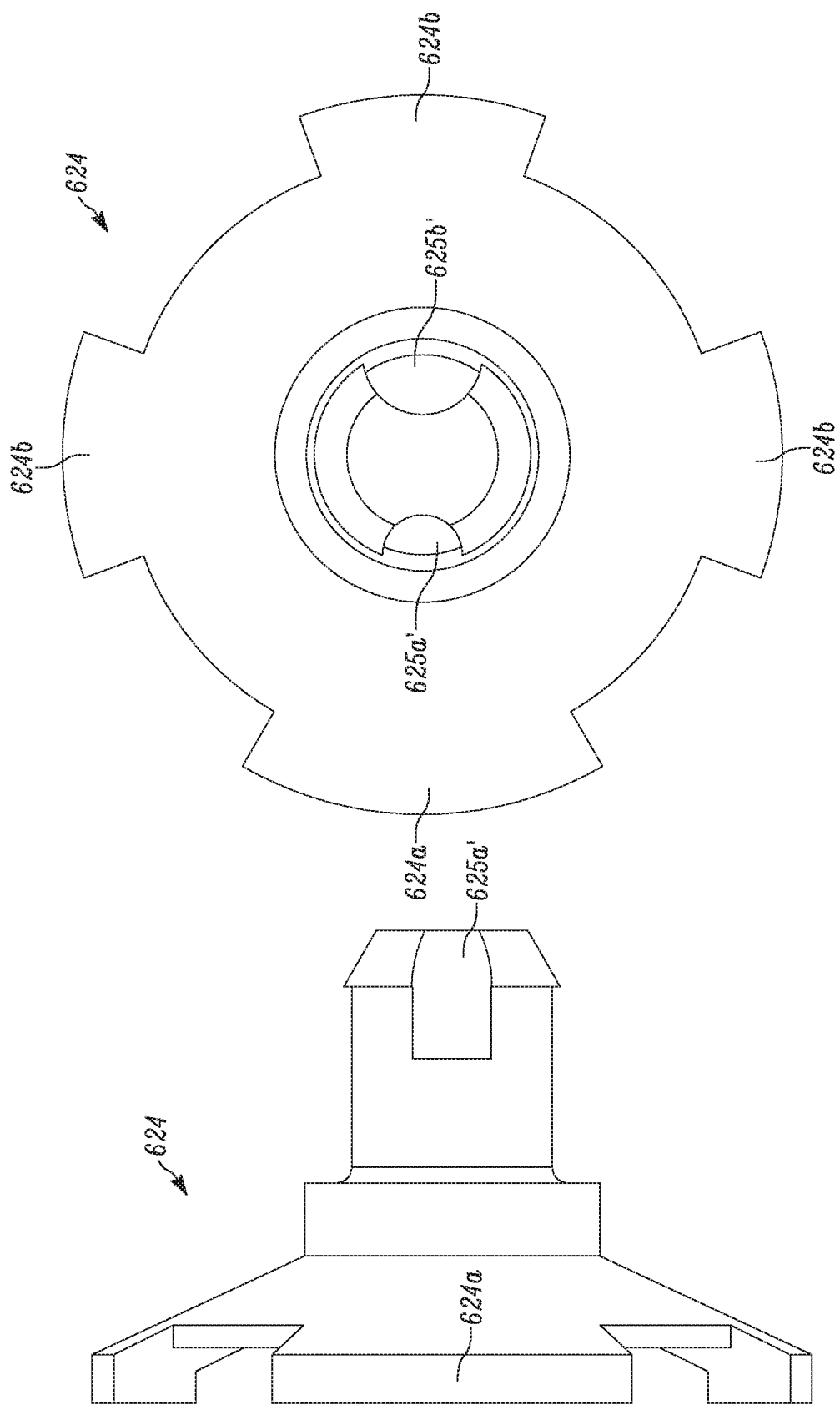
FIGS. 12*a* and 12*b* illustrate the construction of an encoder drive forming part of the invention.
Figure 13:
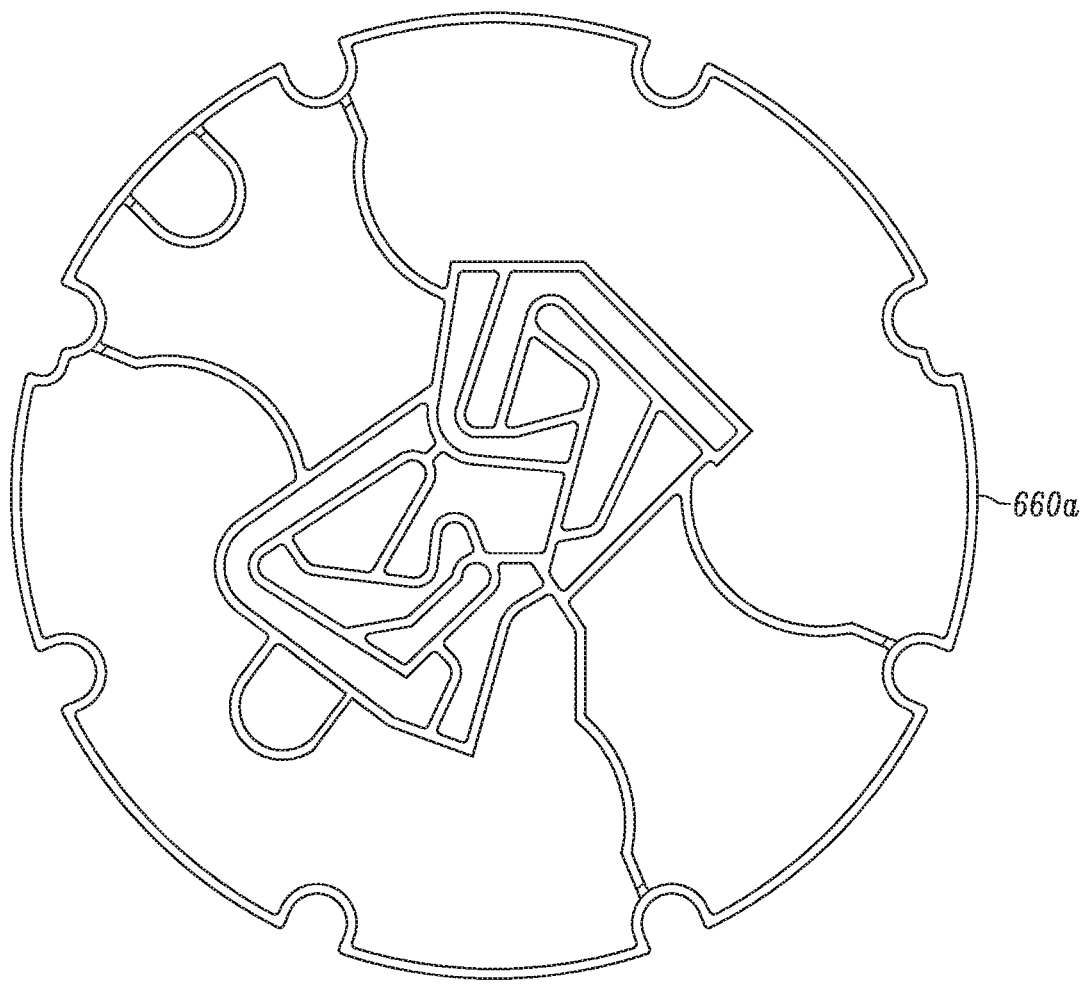
FIG. 13 illustrates a prior art housing seal.

The rotation of the regeneration control disc 120' in the preferred embodiment is driven by the gear motor 142' beneath it and its angular position is monitored by an encoder wheel 623 (having teeth 623a, 623b) that is rotatably coupled to the regeneration control disc 120' by an encoder driver 624 (FIG. 7). The regeneration control disc 120' is coupled to the encoder wheel 623 through the engagement of non-uniform castellations 723*a*, 723*b* (FIG. 11) on the regeneration control disc 120' with mating tabs on the encoder driver 624 (FIG. 12). The encoder drive shaft passes through the cap 687 (FIG. 7) and includes an O-ring seal 687*a* to prevent the escape of pressurized water from the pressurized water cap area below. The top of the encoder driver has 2 asymmetrical keyways 625*a'*, 625*b'* (FIG. 12) that engage with complemental/mating keys 625*a*, 625*b* in the center of the encoder wheel 623 (FIG. 9). This fixes the position of the tooth geometry on the circumference of the encoder with the relationship of the pressure and vent depending wall configuration (shown best in FIG. 4) formed (i.e., molded) under the regeneration control disc 120'. As the gear motor 142' turns the regeneration control disc 120' and that motion is carried up through the encoder driver 624 to the encoder wheel 623. This causes the encoder wheel 623 to rotate causing the encoder teeth 623*a*, 623*b* pass through the encoder reader 620 (FIG. 10). The encoder reader 620 is installed into position from underneath through a new slot 633 (FIG. 19) formed in the same previous regeneration chamber 143' that now houses the gear motor 142'. While this embodiment uses an optical encoder other methods for tracking the rotation would we obvious to those skilled in the art.

The preferred embodiment using the location of the motor underneath the regeneration control disc 120' requires that the regeneration chamber 143 (FIG. 3) in the prior art valve construction that will now house the gear motor and other electronics become a "dry" chamber. In the prior art valve as shown in FIG. 3 that chamber receives the flow stream from the control valve 140 (FIG. 2) that drives the regeneration turbine 142 (FIG. 3). FIG. 1 shows the path of the regeneration drive water initiating as the control valve 75 (FIG. 1) opens allowing water to pass up through regeneration flow control 98 (FIG. 1) and through regeneration flow nozzle 99 (FIG. 1). (The nozzle 99 in FIG. 1 is the same nozzle that is shown in FIG. 3 and denoted by the reference character 141) Referring now to FIG. 3, the nozzle 141 directs the stream of water at the regeneration turbine 142 (FIG. 3) causing it to rotate. From there the water fills the chamber and eventually overflows through vent tube 109 (FIG. 1), into drain chamber 89 (FIG. 1) and down the drain 16 (FIG. 1). With the elimination of the regeneration turbine and gearing used in the prior art system control valve, this stream is no longer needed and the control valve 140 (FIG. 2) can be removed and the hole it operates in (750 FIG. 1) can be closed off. The nozzle 141 (FIG. 3) can also be closed off, thereby leaving control flow chambers that form part of the control 140 available for other uses. It is important to understand that while there are many advantages as discussed in this patent, to adding the gear motor control for the control disc, there are also many advantages to minimizing any changes in the rest of the prior art control valves and supporting structure of the prior art construction. Significant tooling costs and functional testing would be required if major changes were made in the rest of the softener control valve to make this change. The desire is to benefit from the years of successful field operation in the present hydraulic valve and structural body design, while benefitting from the controls upgrade.

Figure 14:
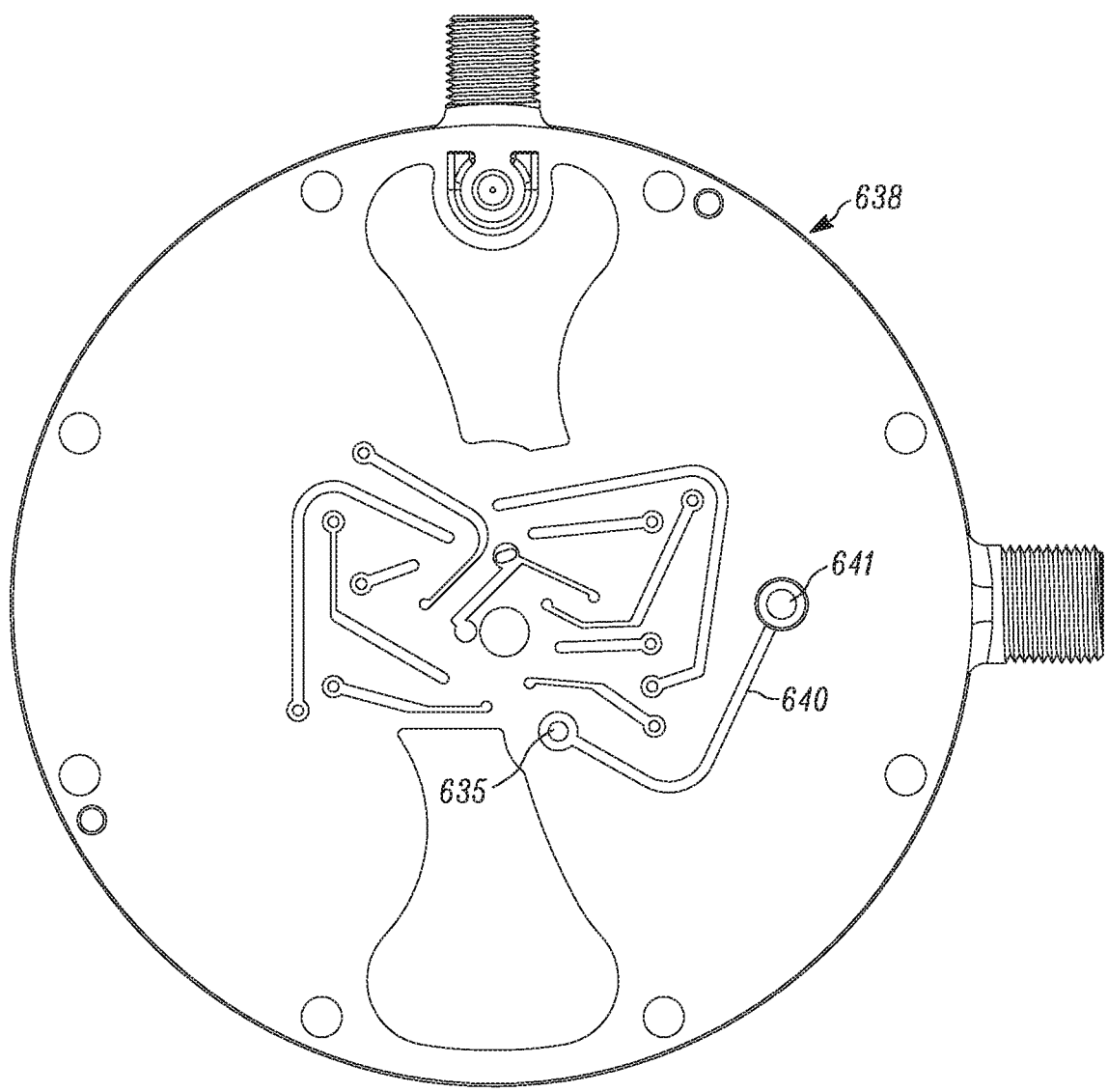
FIG. 14 is an elevational view of a modification made to a prior art control valve, the modification forming part of the invention.
Figure 15:
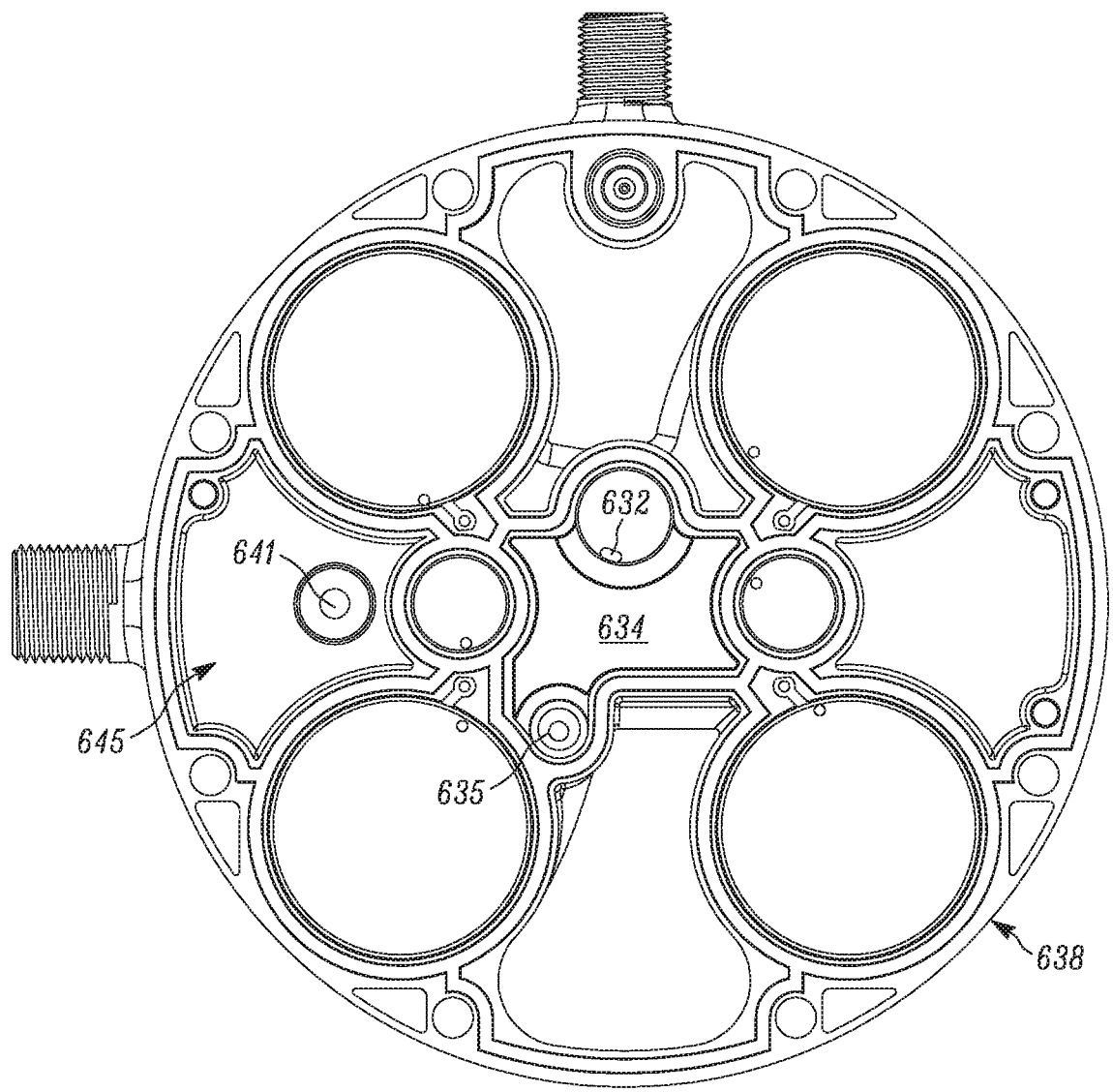
FIG. 15 is a plan view of a bottom level of a control valve constructed in accordance with the present invention.
Figure 16:
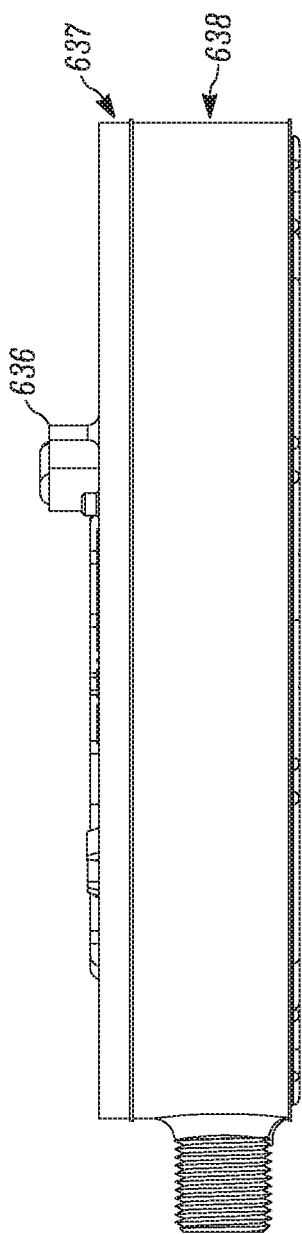
FIG. 16 is a side elevational view showing a "level 2" and a "level 3" subassembly forming part of the present invention.
Figure 17:
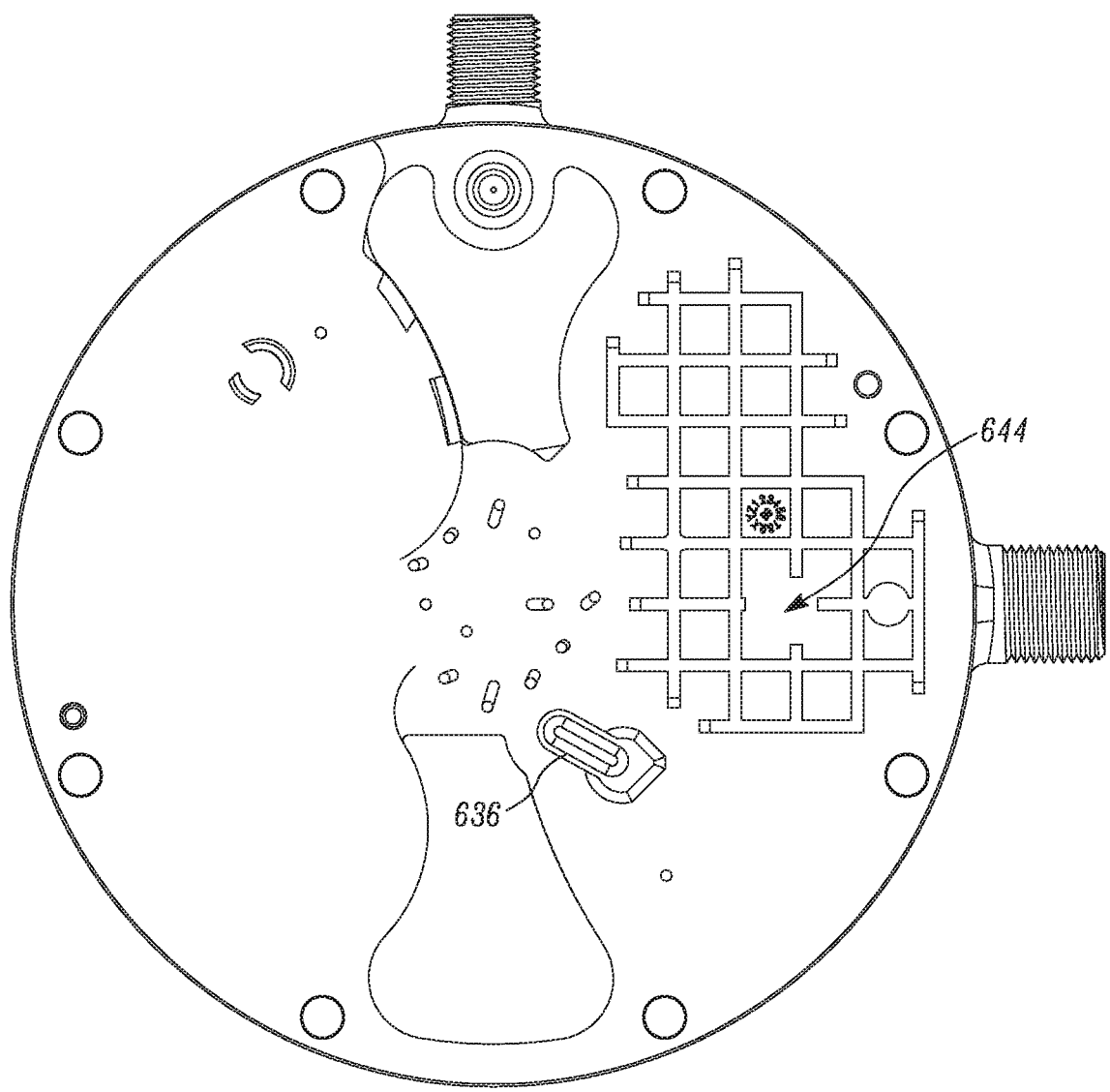
FIG. 17 is a top elevational view of the assembly shown in FIG. 16.
Figure 19:
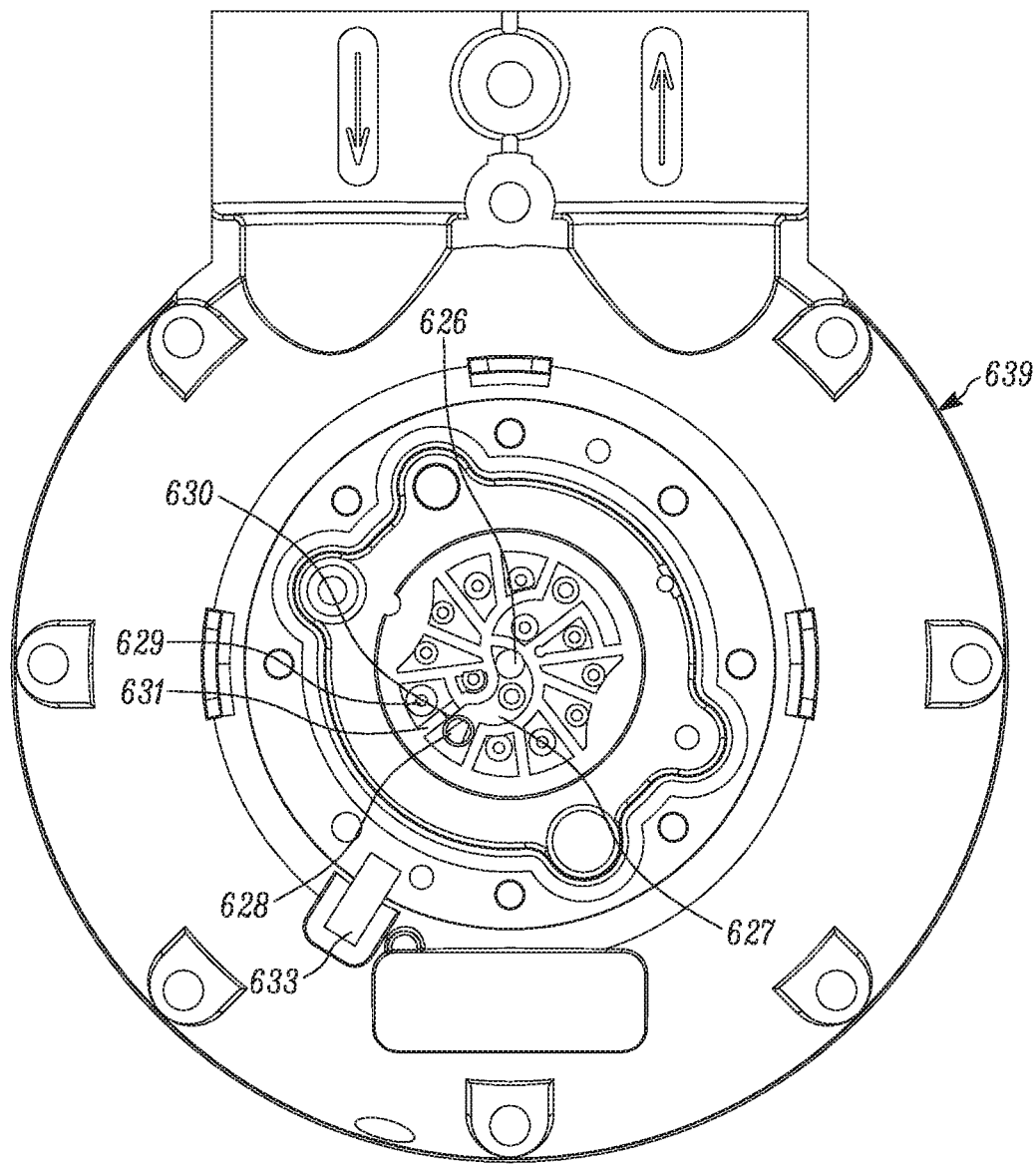
FIG. 19 is a top plan view (with parts removed) of a modified "level 1" of the control valve constructed in accordance with the invention.

In order to make the regeneration chamber 143' a dry chamber, the source of water that presently flows into that chamber must be rerouted. The present vent for the regeneration control disc drain apertures 126*a* FIG. 4 is directed to a port 618 (FIG. 8). This discharges the valve movement vent water into the regeneration chamber and eventually down vent tube 109 (FIG. 1). The vent (drain) from the regeneration control disc exits the control disc-ceramic disc interface around the center pin 250 as shown in FIG. 4. FIG. 19 shows the area under the regeneration control disc in level 1. Center pin location 626 (FIG. 19) vents into chamber 627 (FIG. 19) and down through passageway 628 eventually to port area 618 (FIG. 8). By closing off the port area 618 (FIG. 8) the vent can be sent down through passage way 629 (FIG. 19) which had been previously used to send signals to the regeneration control poppet valve 140. With the control valve 140 no longer needed in the present invention, this passageway 629 (FIG. 19) can be incorporated to carry this signal to drain. This can be accomplished by closing off the existing port that is located in the port area 618 (FIG. 8), cutting a notch 630 (FIG. 19) through signal retaining wall 631 (FIG. 19), allowing the vent water to connect with the port 632 (FIG. 15). With the elimination of the regeneration control valve 140 (FIG. 2), in the present invention the opening that the valve previously seated in can be eliminated leaving the control valve chamber 634 (FIG. 15) to become a sealed chamber capable of becoming a passageway for the vent water. The vent water can now exit the chamber via orifice 635 (FIG. 15 and FIG. 14), which previously fed the nozzle 636 (FIGS. 16 and 17). This nozzle is designated by the reference character 99 in FIGS. 1 and 141 in FIG. 3 and provided the drive water to the regeneration turbine 142 in the prior art control valves.

The various passageways that send the signals down from the control disc 120 and ceramic disc 122 interface to all the lower workings of the softener control valve are formed by trenches and ports that interconnect throughout the valve. These trenches and ports are isolated by seals (gaskets) trapped between the levels of the valve. Beneath the level 1 indicated by reference character 639 (FIG. 19) and by reference number 40 in FIG. 3). The two levels being used for the remainder of the porting is level 2 indicated by reference character 637 (FIG. 16) and 41 (FIG. 3) and level 3 indicated by reference character 638, (FIGS. 14, 15 and 16). These levels are separated by a seal 660*a* (level 2 seal) shown in its existing form in FIG. 13 and in its modified form for this embodiment of the invention installed in level 2 indicated by reference character 660 in FIG. 18.

Figure 18:
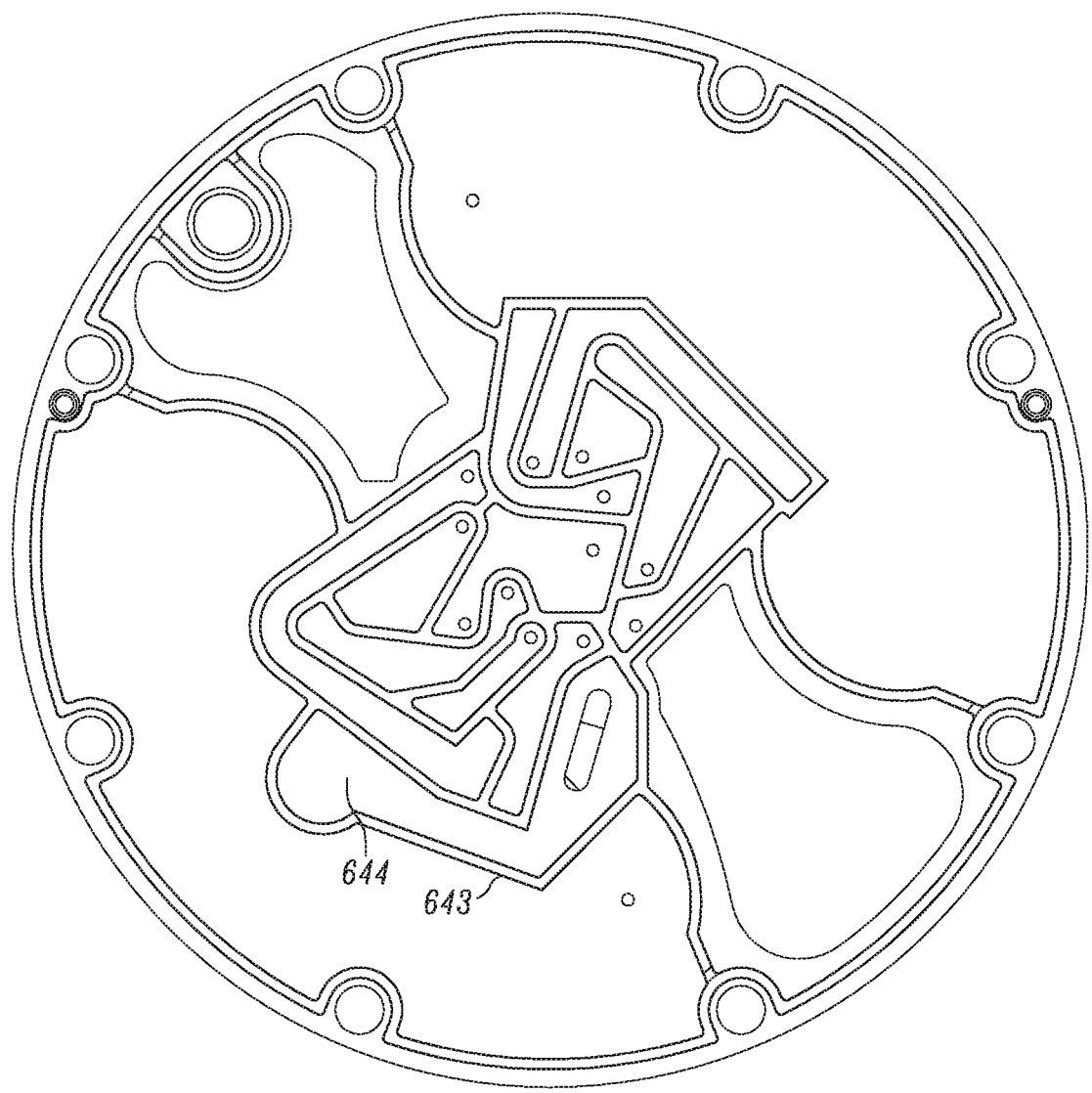
FIG. 18 is an elevational view of a "level 2" forming part of the control valve showing a seal constructed in accordance with the invention.

The redirected vent signal will be sent up through orifice 635 (FIG. 14), and with the exit orifice plugged in the nozzle 636 (FIGS. 16 and 17; reference character 99 FIG. 1), the passageway will no longer discharge to the regeneration chamber 143'. Instead a new trench 640 (FIG. 14) will be cut into the top of level 3 indicated by reference character 638 (FIG. 14) connecting the orifice from the control valve chamber 635 (FIG. 14) with the drain orifice 641 (FIGS. 14 and 15) presently in the level 3. To capture the trench and seal the passageway the level 2 seal will be modified as shown at 643 (FIG. 18). In the prior art control valve, the drain chamber connected to the regeneration chamber to allow for vent tube (109 FIG. 1) to drain the chamber of regeneration drive water. This connection will be closed off by sealing the level 2 at position 644 (FIGS. 17 and 18). This completes the sealed passageway connecting the control disc vent to the existing drain chamber 645 (FIGS. 15 and 89 in FIG. 1.)

As discussed previously, the usage meter turbine (110 FIG. 3) is necessary to measure the volume of water processed and then to trigger a regeneration, backwash or other function after a predetermined volume of water has been treated. In the prior art valve this measurement is done mechanically by converting the rotation of the usage meter turbine (110 FIG. 3) through a gear train up to a usage meter disc 118 that then slowly rotates creating regeneration signals a number of times as it rotates. In one prior art valve (as described in U.S. Pat. Nos. 3,891,552 and 4,298,025 it can create from 1 to 8 regeneration signals per revolution. In another version it has been improved to add more selectivity, as described in U.S. Pat. No. 9,486,801. In both of these cases there are two limiting factors that are related to the metering/regeneration selection process. A gear train ratio must be chosen that determines the number of gallons the turbine will see that will produce one revolution of the meter disc. Next, how many times per revolution or movement of the usage meter disc 116, FIG. 3, 4 (or 116' FIG. 5 or 647, FIG. 7) will the unit signal for a regeneration. These choices allow for the adjustment of the system's regeneration frequency based on volume of water processed, but each do not allow for an exact number to be reached because of the selection process involved with the rotation of the meter disc.

With the use of the gear motor 142' of the present invention, and its associated electronic controls, a different option is available to measure and store the volume processed information. A magnet or magnets can be attached to a turbine that is in communication with the processed water stream and the magnetic pulses created by the rotation of that turbine can be read by a sensor such as a hall effect sensor and those signals can be fed to the electronic controller 600 (FIG. 5) to accumulate, be measured and react when a predetermined set point is reached. There are many options available to use an externally mounted flow meter that could generate pulses that could be fed into the a new controller to produce a value that would represent the gallons of water processed by the softener, water treatment apparatus or filter. That value could accumulate the total of those gallons until they would reach a predetermined set point and be used to trigger a regeneration. Those skilled in the art, could envision many ways to incorporate such a flow meter both externally or redesign the level 1 of the prior art valve housing to incorporate such a flow meter.

Figure 21:
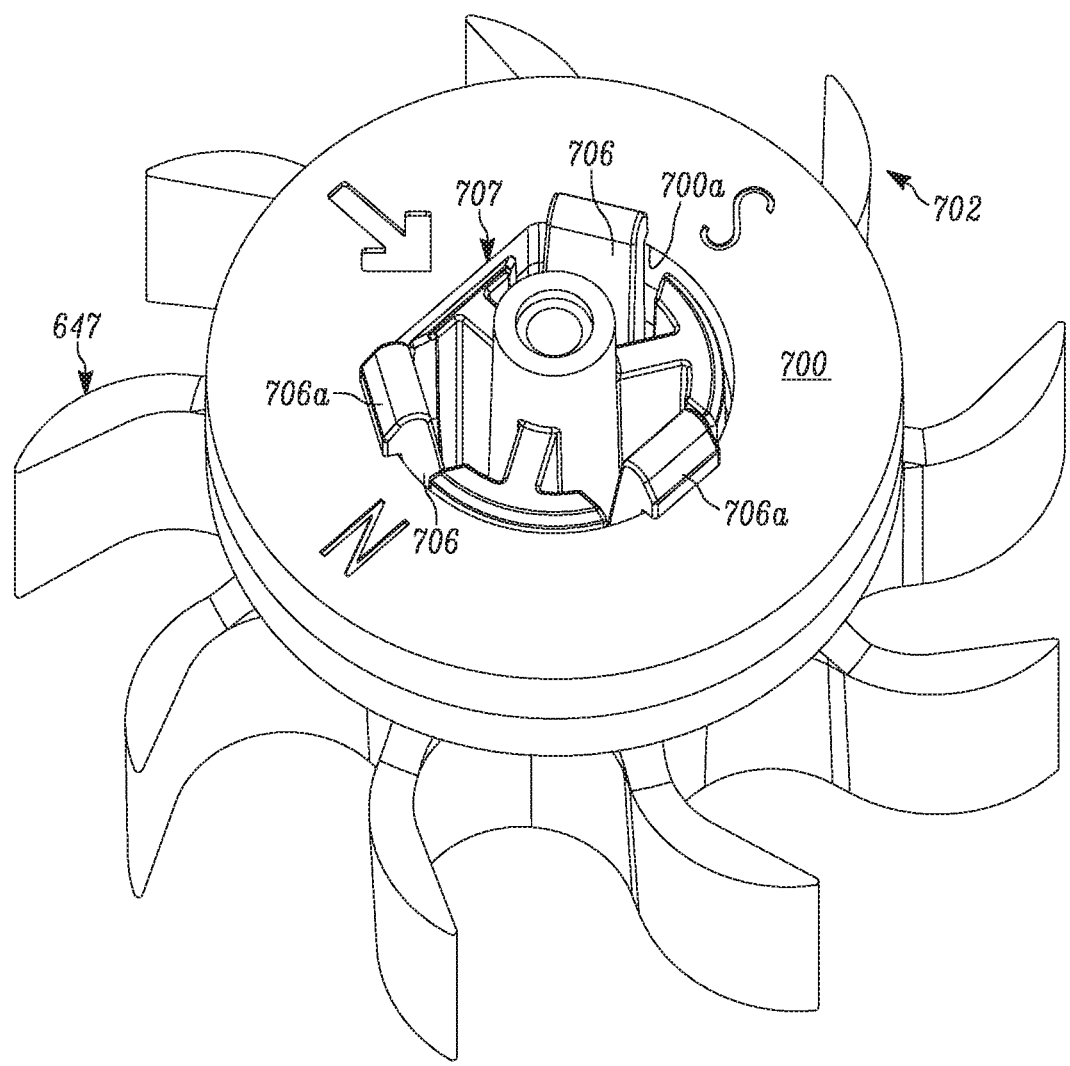
FIG. 21 is a perspective view of meter turbine assembly, constructed in accordance with the invention that includes a ring magnet.
Figure 22:
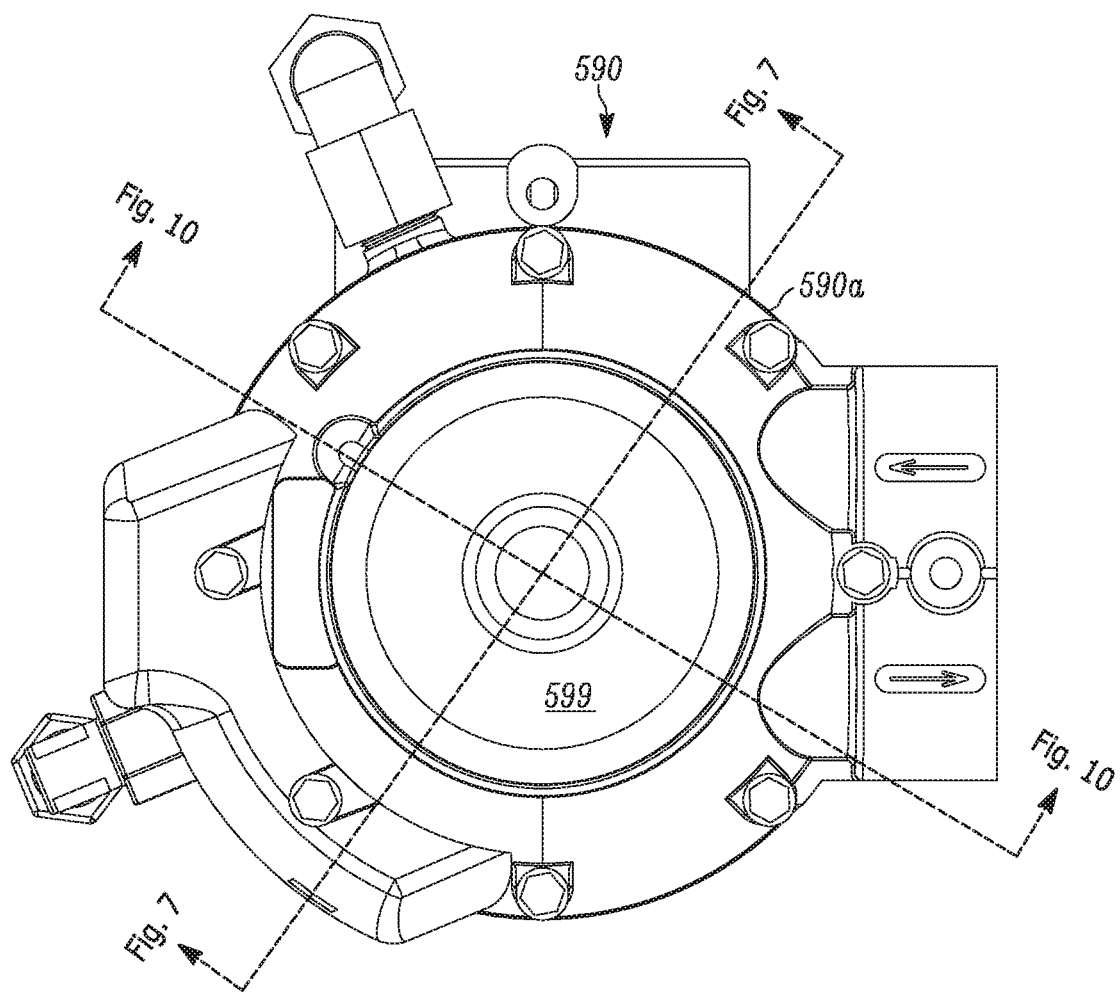
FIG. 22 is a top plan view of the control valve assembly constructed in accordance with the invention.

In the preferred embodiment, the existing meter turbine can be modified by adding a magnet or magnets to it. FIG. 21 shows one preferred method of incorporating a magnet as part of the usage turbine 647 (in FIG. 5). In the embodiment shown in FIG. 21, a ring magnet 700 having a protective coat to improve life in the water stream, can be snapped into place with the turbine assembly 702 which includes the turbine 142'. This assembly can operate within the existing Level 1 housing geometry, keeping the same proven positioning and nozzle turbine relationships described in U.S. Pat. No. 7,373,949. The turbine assembly includes three (3) outwardly springing fingers 706 that include prongs 706a. The ring magnet 700 includes a center opening 700a configured and sized to allow the fingers forming part of the turbine to pass though the opening 700a and then spring outwardly to allow the prongs 706a to engage the top of the ring magnet 700 (as viewed in FIG. 21) thus clamping the ring magnet 700 to the turbine 142'. In addition, the ring magnet center opening 700a includes a flat 707 that engages a corresponding flat formed on the turbine 647. The engagement of the flats inhibits relative rotation between the ring magnet 700 and the turbine 647.

Figure 24:
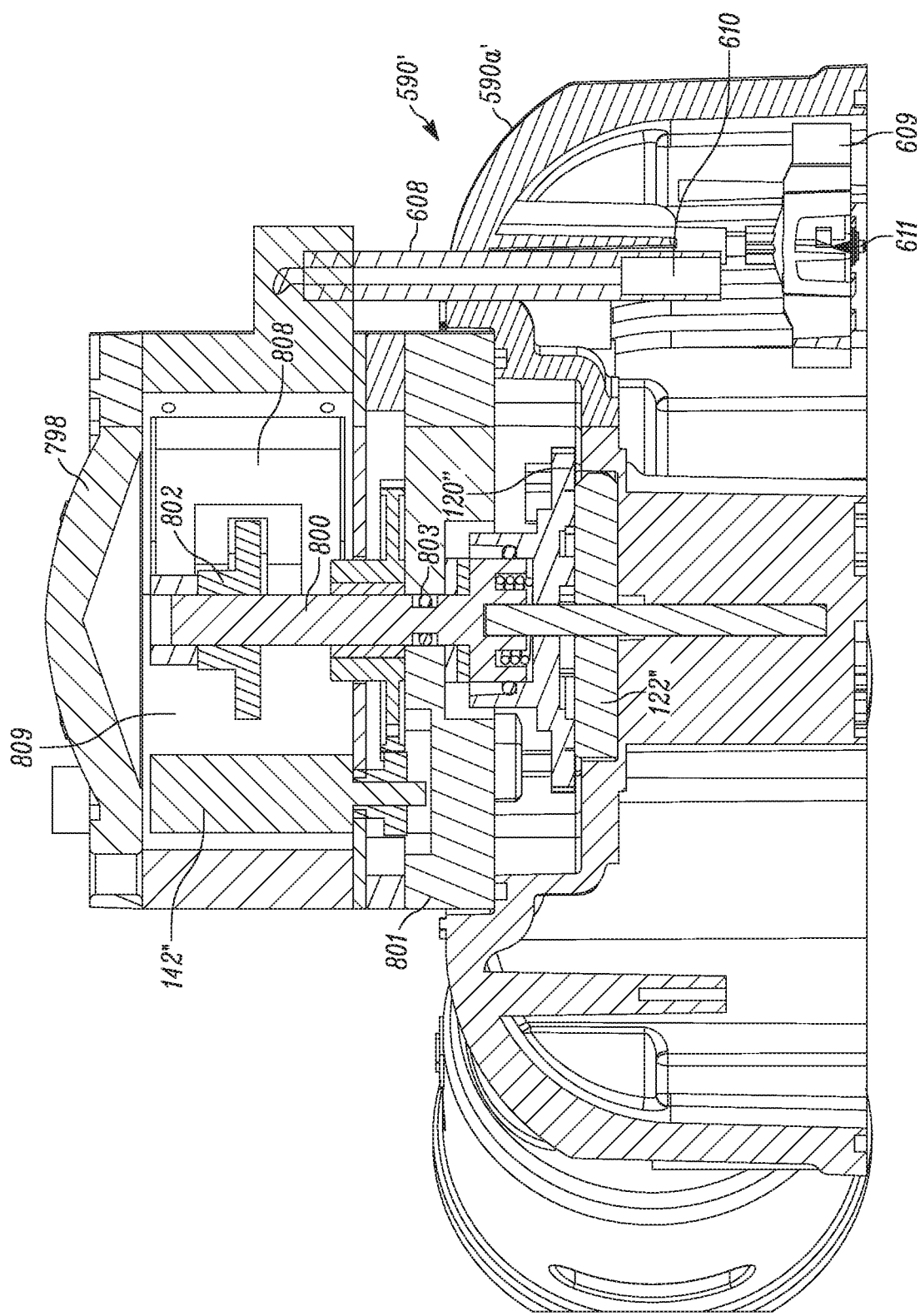
FIG. 24 is another fragmentary sectional view of the top section of the control valve shown in FIG. 3.

In one embodiment shown in FIG. 24, magnet 611 can be added to the turbine in one of many ways including potting compound, molded housings, adhesive etc. One or more magnets can be added with the total exceeding 1 so a balanced turbine can be achieved. FIG. 24 shows a conduit suspended from above housing hall effect sensor 610 (FIG. 24) close enough to the turbine 609 (FIG. 24) to pick up the magnetic pulses and sealed in such a manner to prevent water from entering the conduit. In the preferred embodiment the ring magnet design (FIG. 21) has advantages in that the ring design tends to produce a balanced turbine without the alignment problems that would exist in trying to mount multiple small magnet pieces. In the preferred embodiment, the hall effect sensor 648 (FIG. 7) could be mounted outside the level 1 chamber, positioned close enough to the wall of the Level 1 that it can effectively read the magnet pulses from the ring magnet 646 (FIG. 7) that is attached to the turbine 647 (FIG. 7) through the wall thickness. FIG. 3 shows the assembly in the prior art valve, whereas FIG. 19 shows the preferred embodiment. With the changes made In the preferred embodiment of the present invention, the gear train 283 (FIG. 4) associated with turbine 116 (FIG. 3), eccentric pin and shaft 270 (FIG. 3), and pawls (274 and 278 FIG. 4) can all be eliminated adding to cost reductions and decreased time of assembly.

U.S. Pat. No. 4,298,025 describes a feature that allows an operator (homeowner) to have the ability to advance the regeneration control disc 120' into a regeneration and/or step through a regeneration manually. With the electronic control of the propose invention, this may only be needed if there was a loss of electric power and/or if any battery back-up included was not functioning or powerful enough to drive the unit through the desired number of regenerations needed. Therefore, one embodiment of the present invention would include the ability to manually move the regeneration control disc 120' to any desired regeneration step. This would allow a homeowner to finish a regeneration if needed or to perform a full regeneration by stepping the unit through the sequence while timing those steps himself. This feature also is helpful for troubleshooting a valve while on site. This feature is included in the present invention by providing a means to disengage the motor drive while rotating the regeneration control disc. It is important for the encoder and control disc to remain synchronized so that when power returns the control logic could again take over and it would know where the stop positions were.

Figure 20:
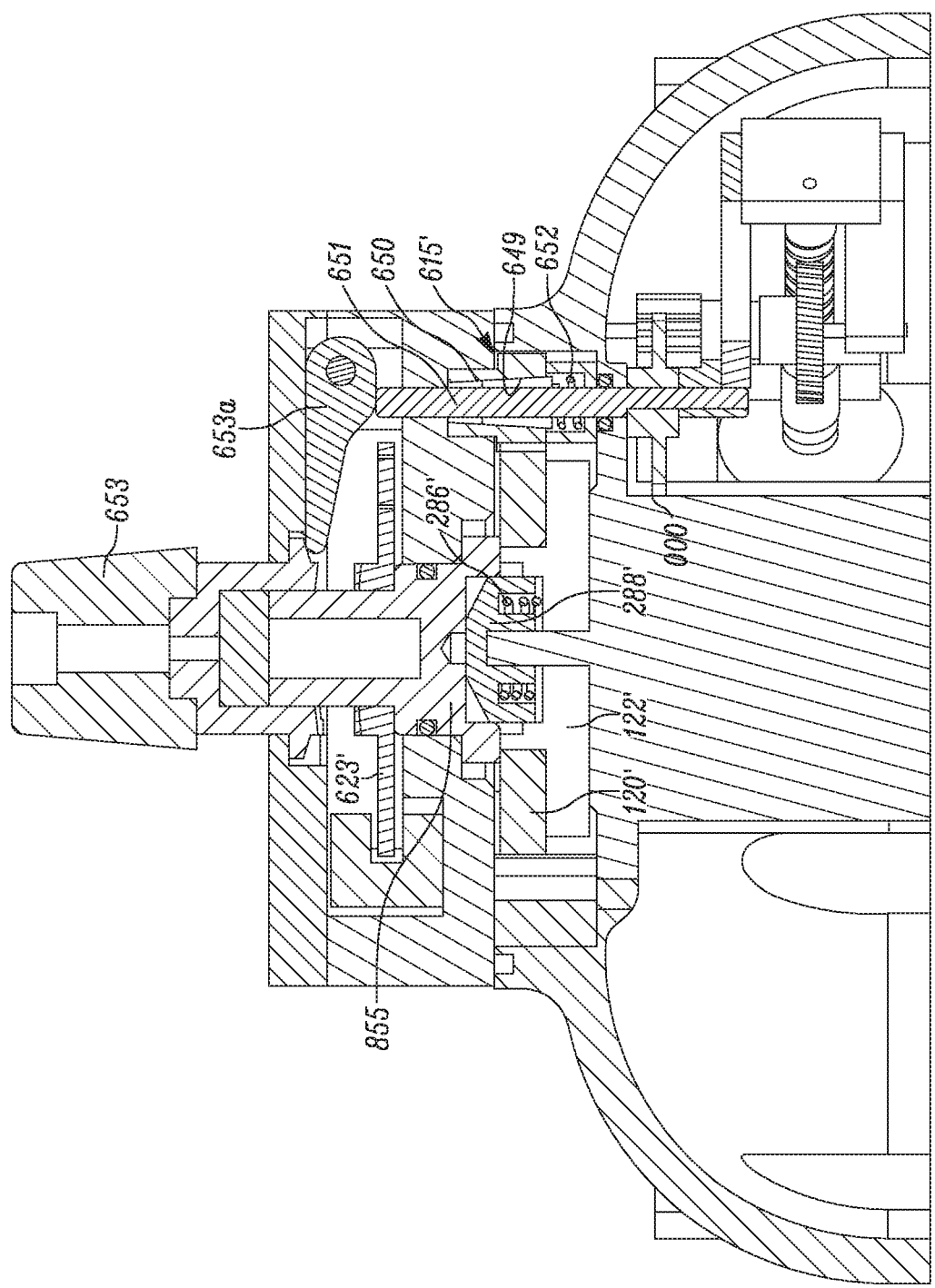
FIG. 20 is a sectional view of an upper section of the control valve that includes a manual override, constructed in accordance with the invention.

In one embodiment as shown in FIG. 20, a drive pinion that is engaged with the regeneration control disc 120' is connected to the drive motor shaft by a tapered bushing type friction clutch formed by the mating of a tapered bore 649 of a pinion 615' (FIG. 20) with the mating tapered cone 650 on the pinion shaft 651 (FIG. 20). In its normal operating position the two tapers are held together by a spring 652 (FIG. 20). Pushing down on the actuator 653 (FIG. 20) operates a cam toggle 653a (FIG. 20) which pushes down on the shaft 651 (FIG. 20), disengages the tapers and allows the pinion to rotate freely. There are various means that a similar disengagement can be carried out using a tapered spline, pins and indents, etc. All could be deactivated by the downward movement of the shaft. As is the case in the other embodiments, drive hub 855 (FIG. 20) is connected to the regeneration control disc 120' (FIG. 20) through some means like a keyway or spline, so that it always rotates with the control disc. Similarly, the encoder 623' (FIG. 20) is also locked to the drive hub, so it also turns with the regeneration control disc, thereby maintaining its angular relationship with the control disc. Pushing down on the actuator 653 (FIG. 20) engages it with the drive hub 655 (FIG. 20) so when the actuator is rotated it rotates the regeneration control disc which is no longer locked in with the drive pinion. Releasing the actuator 653 (FIG. 20) then allows the drive pinion to re-engage with the regeneration control disc 120' and the gear motor would once again control the regeneration control disc's (FIG. 20) rotation based on the encoder's 654 (FIG. 20) position.

Figure 23:
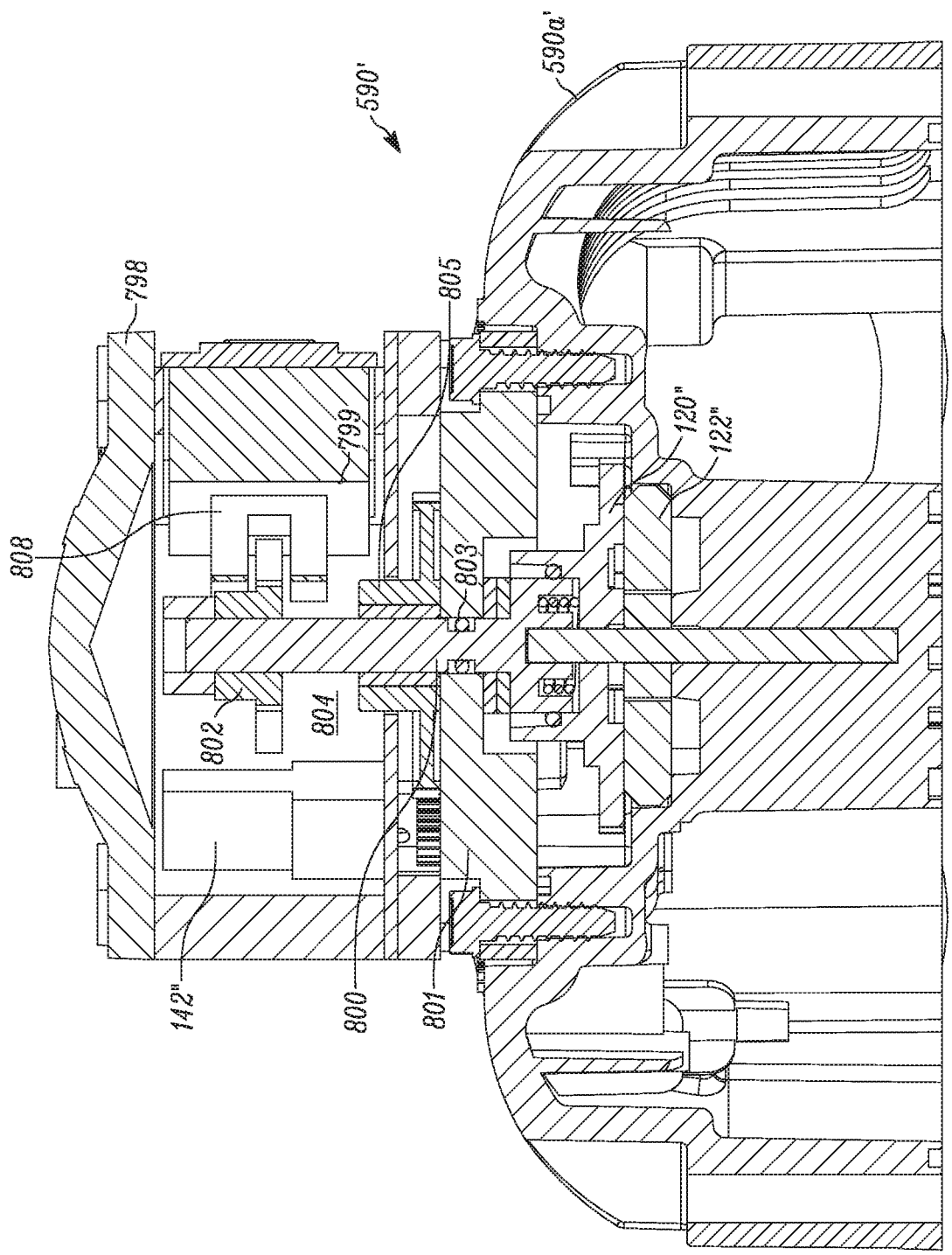
FIG. 23 is a fragmentary, sectional view of an upper section of a control valve constructed in accordance with another embodiment of the invention.

FIGS. 23 and 24 show another embodiment of the control valve construction that includes a top mounted gear motor 142". In this design, a significant amount of height is added to a water treatment control valve 590' which may be problem when trying to incorporate this type of control in systems that are mounted in cabinets, in tight spaces etc.

To drive the regeneration control disc from above as shown in FIG. 23, a motor 142" (FIG. 24) is housed in a new dry area or chamber 809 created above the existing cap area. The existing cap (FIG. 3) is replaced by a new cap 801 (FIG. 23) which contains the water pressurized area and the regeneration control disc 120" (FIG. 24) beneath it. A new drive shaft 800 (FIG. 24) is provided to extend upward from the control disc 120" (FIG. 23), through the cap 801 (FIG. 23), and coupled to a drive gear 805 and then to an encoder 802. The shaft is sealed by an o ring 803 as it passes through the cap 801, containing the water pressure and keeping the area above the cap dry.

In this embodiment, the controller 600 may be mounted in the control valve housing. In particular, the controller 600 may be mounted in the chamber 809.

The angular relationship between the control disc 120" and the encoder 802 are maintained and held constant by key ways, splines, etc. The drive gear 805 (FIG. 24) can also be keyed to the shaft 800, but it is not necessary as the motor will get its start and stop signals from the encoder, as it passes through the encoder reader 808 (FIG. 24). This embodiment shows the use of an optical encoder, but it would be clear to those skilled in the art that other means of measuring angular positioning such as counting magnetic pulses or measuring the resistance of a rotating potentiometer or others could be equally as effective. The key is to keep the relationship between the regeneration control disc 120" and the angular measuring device i.e. encoder 802, fixed, and able to easily be re-coupled in the same position should the unit be disassembled for service. The electronics that control the motor can either be included in the dry area, depending on size and complexity, or housed remotely with a cable interface.

There are numerous connected products today that homeowners or business owners can use to their advantage. Everything from home security systems using cameras or other sensors to monitor and alert the homeowner to problems or circumstances requiring their attention or just providing data that the homeowner may find of interest. These connected products can communicate remotely over the internet using the homeowners WiFi or can communicate locally to smart devices like smart phones or tablets using communication methods such as Bluetooth. Any one of the embodiments of the invention now would allow for this type of connected relationship to be set up with the new water softener water treatment system or filter controlled by the gear motor driven design of the invention. The same electronic controls that will accumulate the magnetic pulses of the flow meter and then drive the gear motor to operate the control valve through the rotations of the control disc, can also be outfitted with the communication devices that would allow the controller 600 to be wirelessly connected to a receiver, i.e., laptop for monitoring, programming, data download, etc. purposes. Those skilled in the art can easily adapt or add available Bluetooth or Wi-Fi components 850 to the controller 600 as shown in FIG. 5 that would permit the sending of data related to volume of water used per unit time, number of regenerations performed etc. The invention allows for the adjustment of all the regeneration related functions, such as length of time and the sequence of regeneration steps, the volume of water processed that triggers a regeneration, and with the inclusion of a time keeping program, the periodic regeneration based on time rather than water volume. The time of day the regeneration takes place can also be adjusted. If the controls for the valve were connected through WiFi or other means those types of adjustments could be made from a remote location. In some cases where the servicing company is far away from the actual location of the equipment this could have significant advantages to efficiency of service.

Additional Operational and Construction Details of the Prior Art Control Valve Shown in FIGS. 1-4

FIG. 1 schematically illustrates a prior art water treatment system. The system includes a pair of resin tanks 10, 12 interconnected by a control valve module 14 that is similar to the control valves described in U.S. Pat. Nos. 4,298,025 and 3,891,552 which are hereby incorporated by reference. A source of regeneration solution indicated generally by the reference character 15 is connected to the valve 14.

The control valve assembly 14 controls the communication of a source of water to be treated, indicated generally by the reference character 16 with the treatment tanks 10, 12; the communication of the tanks with an outlet indicated by the reference character 18; and, the regeneration of an exhausted tank.

The valve assembly 14 includes a plurality of water pressure operated valves, the opening and closing of which are controlled by a fluid signal control system. Whether the tanks 10, 12 are on-line or off-line is determined by a pair of inlet valves 70, 72 disposed in an inlet chamber 74 and a pair of outlet valves 76, 78 disposed in an outlet chamber 80. The inlet conduit 16 fluidly communicates with the inlet chamber 74. The inlet valves 70, 72 control the communication between the inlet chamber 74 and respective tank inlet passages 82, 84. Opening the valves 70, 72 allows feed water in the inlet conduit 16 to proceed into the tanks 10, 12, respectively.

The valves 70, 72 are operatively connected to a piston 88, 90 disposed in chambers 92, 94, respectively. The application of fluid pressures above the pistons apply valve closing forces to urge the valves 70, 72 into engagement with respective valve seats 70a, 72a. The application of fluid pressure to the underside of the pistons exerts valve opening forces.

The outlet valves 76, 78 are similarly configured and include pistons 96, 98 disposed in chambers 100, 102. The application of fluid pressure above and below the pistons 96, 98 applies valve closing and opening forces, respectively for moving the valves 76, 78 towards and away from associated valve seats 76a, 78a.

The valves 76, 78 control the communication between tank outlet passages 104, 106 of the tanks 10, 12, respectively with the outlet chamber 80. The outlet passages 104, 106 are connected to the top of the tanks 10, 12 and are in fluid communication with respective risers 107, 109. The risers extend downwardly from the top of the tanks and open near the bottom of the respective tanks. In normal service, water to be treated is introduced at the top of the tank by an associated inlet passage 82, 84. The water travels downwardly through a treatment media located in the tank and is discharged from the tank by way of the associated riser. In short, the treated water leaves from the bottom of the tanks 10, 12 and travels upwardly through the riser tubes 107, 109 and into the respective outlet passages 104, 106.

When either of the valves are open, water flow from the associated tank is allowed to proceed to a water collection chamber 110 by way of a passage 112. The collection chamber 110 communicates with the outlet conduit 18 through a fluid path that includes a passage 114 and an outlet chamber 116 that includes a rotatable turbine 116a. As fully described in U.S. Pat. Nos. 3,891,552 and 4,298,025, the turbine is mechanically coupled to a usage monitoring disk 118 (shown in FIG. 2) which rotates as a function of the amount of water discharged through the outlet chamber 116 into the outlet conduit 18.

Figure 3:
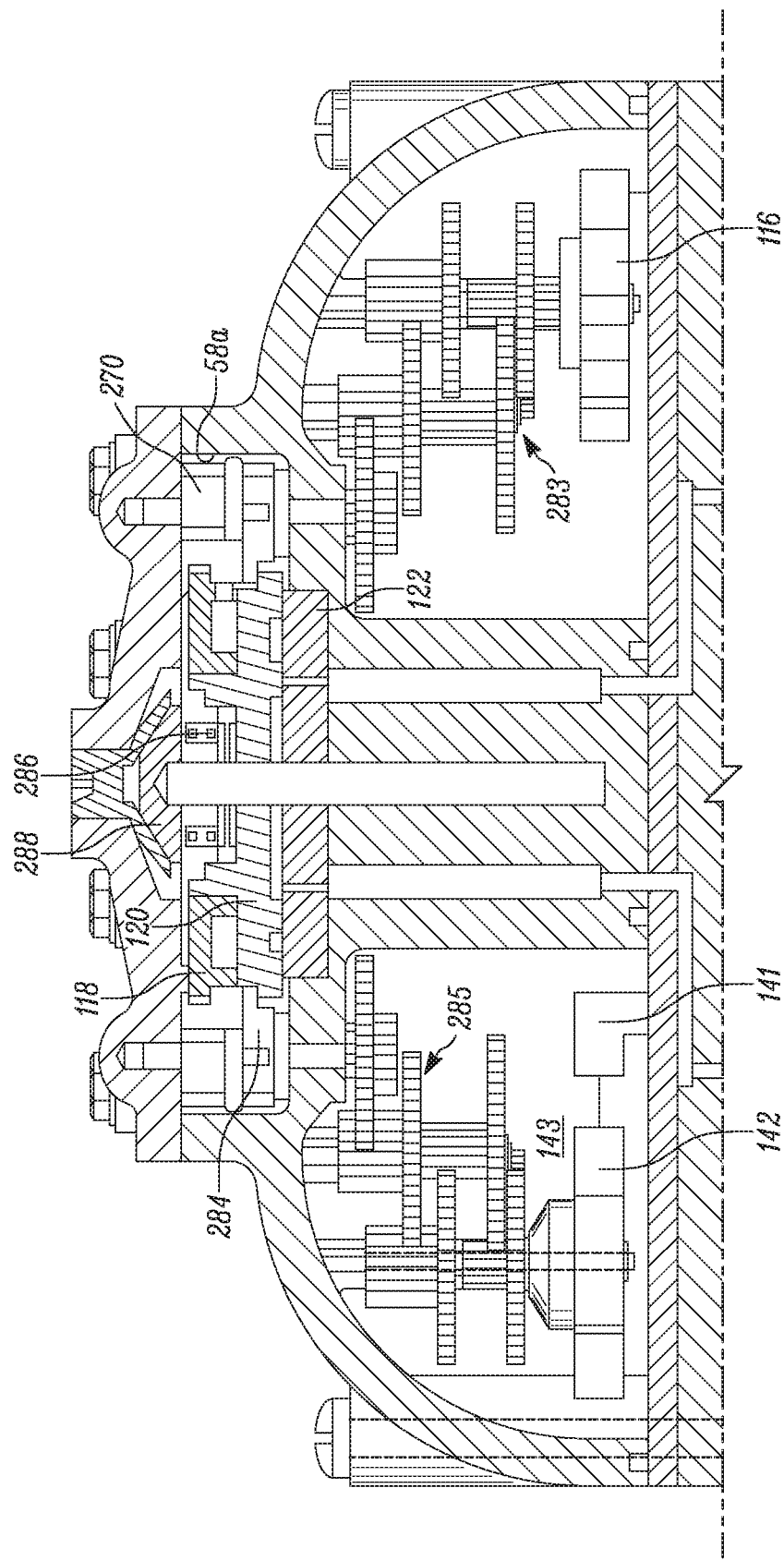
FIG. 3 is a fragmentary, sectional view of a level 1 of a prior art valve.
Figure 4:
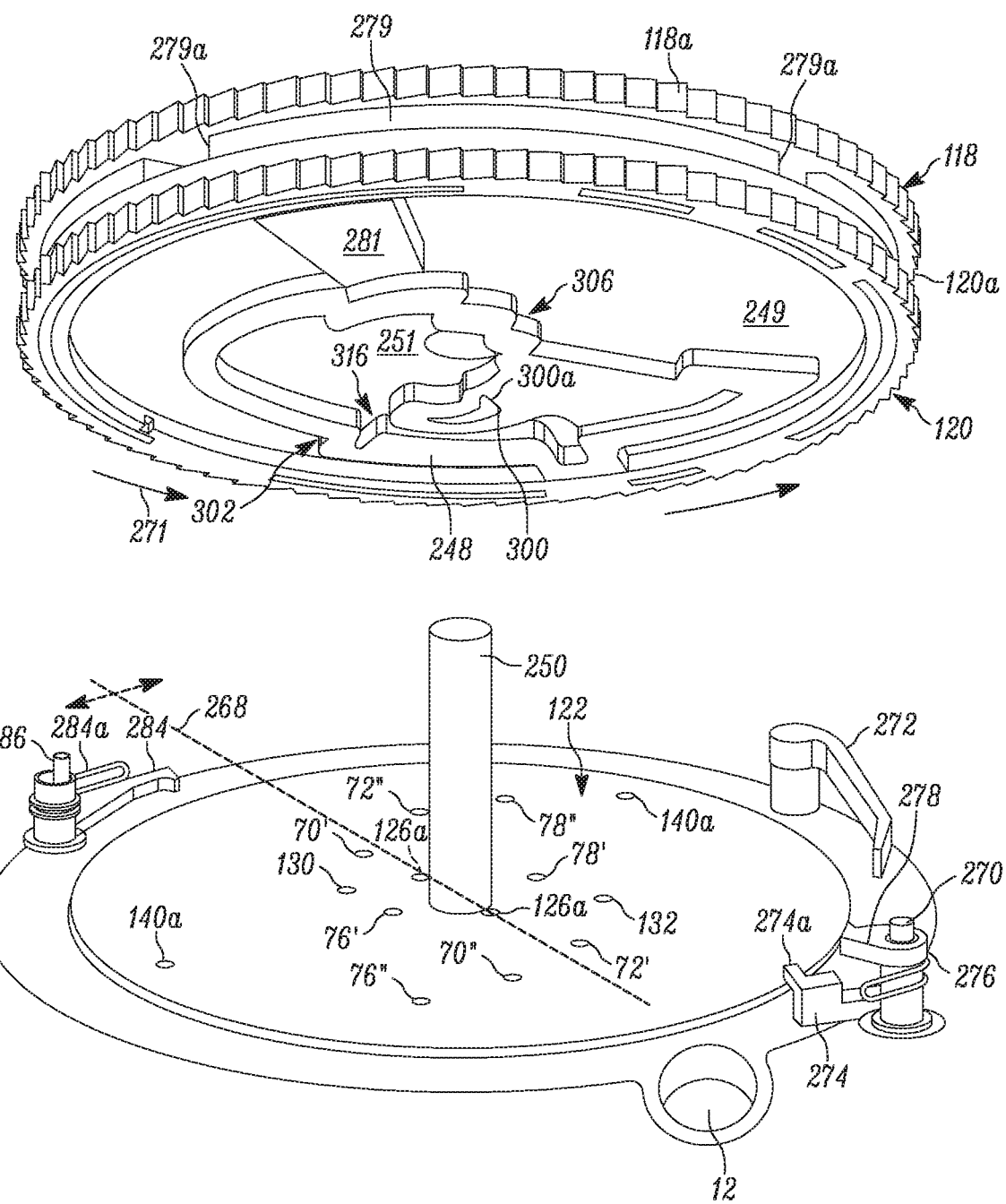
FIG. 4 is a schematic, perspective view of a servo control system that forms part of a prior art control valve.

Referring also to FIGS. 3 and 4, the usage monitoring disk 118 cooperates with a regeneration control disk 120. The control disk rotates atop an annular ceramic insert 122 that defines a plurality of ports each communicating with an associated signal line. Signal lines a-k are illustrated in FIG. 2. Each line extends from the port insert 122 to one of a plurality of piston chambers. The control disk 120 sealingly engages the top surface of the insert 122 and includes structural formations that operate to communicate the ports formed in the insert 122 with either water supply pressure (supplied by a passage 124 shown in FIG. 2) or ambient pressure (by communicating the ports with one of two drain passages 126a shown in FIG. 4). In FIG. 2, the drain passages 126a are represented by a single drain line designated as 126. The ports and regeneration control disk 120 are arranged so that as the regeneration wheel 120 rotates, the valves are sequentially operated in order to cycle an exhausted tank through a regeneration cycle.

In addition to the valve elements described above, the control valve assembly 14 also includes a pair of drain valves 130, 132 for controlling the communication of the tank inlet passages 82, 84, respectively, with a drain chamber 134 through respective branch passages 82a, 84a. The drain chamber 134 communicates with ambient pressure drain through a drain conduit 135.

The drain valves 130, 132 are operated by pistons 136, 138 disposed in respective piston chambers 150, 152. In the preferred embodiment, the pistons are single acting and are driven to a valve open position by the application of fluid pressure to their top surfaces via signal lines a, b. When the fluid signals applied to the top piston surfaces is terminated, the drain valves 130, 132 are returned to their closed positions by a biasing force generated on the underside of the pistons by back pressure developed in the drain chamber 134. The back pressure in the drain chamber 134 is developed due to a flow restrictor 139 disposed in the drain conduit. As the drain valves near their closed positions, fluid pressure in the conduits 82a, 84a apply additional force to the valve heads tending to fully close the valves and maintain their closure. In an alternate embodiment, biasing springs (not shown) bias the valves towards their closed positions illustrated in FIG. 1 when the associated signal lines a, b are depressurized.

A regeneration control valve 140 controls the communication of water pressure from the water collection chamber 110 to a regeneration control turbine 142 located in a turbine chamber 143. The valve 140 includes a single acting piston 144 disposed in a chamber 146. The valve 140 is biased to its closed position by back pressure generated by a flow restrictor 149a disposed in a delivery passage 149 which controls the flow rate of water from the collection chamber 110 communicated through a passage 148, when the valve 140 is opened. When the regeneration control valve 140 is opened (by the application of a fluid signal to the top surface of the piston by way of the signal line k) water pressure is allowed to proceed from the passage 148 to the passage 149 which includes a nozzle 141 (shown only in FIG. 3) for directing water against the turbine 142. The turbine 142 is mechanically coupled to the regeneration control disk 120 so that rotation of the turbine effects rotation of the control disk 120.

The application of fluid signals to the various piston chambers, as controlled by the relative movement of the regeneration control wheel 120 with respect to the port insert 122, determines the sequence of valve actuation. The control disk 120 selectively communicates either water pressure from the collection chamber (fed to the disk by the pressure line 124) or the ambient drain pressure via the passage 126 (which communicates with the drain ports 126a shown in FIG. 2), to the various signal lines.

The regeneration components include a regeneration fluid aspirator 260 disposed in the collection chamber 110. The aspirator comprises a fluid flow regulating element 264 and a venturi 260a. The outlet of the venturi communicates with the tank outlet passages 104, 106 through branch passages 104a, 106a that include check valves 280, 282. The throat of the venturi communicates with the source of regeneration solution 15.

When either of the drain valves 130, 132 are opened (and the respective inlet and outlet valves are both closed), water in the collection chamber 110 is allowed to proceed through the venturi 260a and into the tank being regenerated. For example, suppose the drain valve 130 is opened. Water from the collection chamber will flow through the venturi 260a into the outlet passage 104 of the tank 10 (via passage 104a). The water will then travel through the tank assembly 10 in a counterflow direction and be ultimately discharged to the ambient drain by way of the inlet passage 82, the branch passage 82a and the drain chamber 134. As water passes through the venturi, regeneration fluid is drawn from the regeneration source 15 through a supply conduit 220 and mixed or "aspirated" with the venturi fluid. The regeneration fluid (now diluted with treated water) passes through the tank being regenerated. The effluent from the tank is discharged to drain via the drain chamber 134.

The sequence of regeneration steps as well as the frequency of regeneration is controlled by the regeneration control disk 120 and the usage disk 118, respectively. Referring to FIGS. 2, 3 and 4, the regeneration control disk 120 sealingly engages and rotates atop the circular port-defining insert 122. The ports defined by the insert 122 communicate with the various piston chambers. The underside of the regeneration control disk 120 includes a depending wall 248 that divides the underside of the disk 120 into pressurized and drain regions 249, 251. The port insert 122 includes a pair of drain apertures 126a located on either side of an upwardly extending stub shaft 250 about which both the regeneration control disk 120 and the water usage disk 118 rotate. The drain apertures 126a communicate with the drain chamber 134 through the passage 126 (shown in FIG. 2) which is integrally formed in the valve body. Thus, the drain region of the regeneration control disk is maintained at the ambient drain pressure.

Two sets of ports are provided in the insert 122 and are located symmetrically about an imaginary diametral line 268. The ports to the left of the line 268 control the regeneration sequence for the tank 10 whereas the ports to the right of the line 268 control the regeneration sequence for the tank 12. During a regeneration cycle, the control disk 120 rotates 180° to effect the complete regeneration cycle of one of the tanks. The location of the ports and their function, as shown in FIGS. 2-4 correspond to the ports shown and described in U.S. Pat. Nos. 3,891,552 and 4,298,025. As fully explained in these earlier patents, the depending wall 248 controls the communication of pressurized water from the pressurized region 249 to the ports or communicates the ports with the drain region 251 to depressurize the respective chambers. The inlet and outlet valves 70, 72, 76 and 78 each include a "top" and a "bottom" port. The "top" ports communicate with the top of the associated operating pistons 88, 90, 96, 98 and the pressurization of these ports apply a valve closing force. Conversely, the "bottom" ports communicate with the underside of the pistons and apply valve opening forces when pressurized.

To facilitate the explanation, the ports shown in FIG. 2 will use the same reference characters as those used for the valves with which they communicate. If a given valve has both an upper and lower port, the upper port will be designated by the same reference character that is used for the valve it controls, followed by a single apostrophe. The bottom port for that valve will be designated by the same reference character followed by a double apostrophe. For valves that only require a single port, i.e., the drain valves 130, 132, the port will be designated by the same reference character that is used for the valve. As an example, the port marked 70' communicates with the region above the piston 88 of the intake valve 70 via signal line f. The port marked 70" communicates with the underside of the piston 88 of the valve 70 via signal line e. The port marked 130 communicates with the drain valve 130 via the signal line b.

Usage disk 118 and the regeneration control disk 120 are preferably rotated by a drive mechanism fully disclosed in U.S. Pat. No. 4,298,025. Referring to FIGS. 2, 3 and 4, the disks 118, 120 are driven by a ratcheting mechanism that includes a plurality of pawls. As seen best in FIG. 4, the usage disk 118 rotates atop and concentrically with the regeneration control disk 120. The disks 118, 120 each include peripheral ratchet teeth 118a, 120a respectively. The water usage disk 118 is rotated by a pawl arrangement indicated generally by the reference character 270. Both discs rotate in the direction indicated by the arrow 271; an anti-reverse pawl 272 prevents reverse rotation of the disk 118.

The pawl arrangement 270 includes a pair of individual, spring biased pawls 274, 276, concentrically journalled on an eccentric shaft 278. The shaft 278 is coupled to the water usage turbine 116 through a reduction gear train 283 (shown in FIG. 3). In operation, the usage turbine 116, and hence the water usage disk 118 rotates in proportion to the amount of treated water discharged by the control valve assembly.

The usage disk 118 also includes an axially depending flange 279 that is interrupted by a plurality of circumferentially spaced slots 279a.

The number and position of the slots 279a determine the frequency of regeneration. The lower pawl 274 of the ratchet mechanism 270 includes a prong 274a that extends into sliding engagement with the flange 279. The prong 274a is sized so that when in engagement with the flange, the pawl 274 is maintained out of engagement with the regeneration control disk 120. When the prong 274a enters one of the slots 279a, the pawl 274 engages the ratchet teeth 120a of the regeneration control disk 120 so that rotation of the eccentric shaft 278 causes concurrent rotation in the disks 118, 120. The initial rotation of the regeneration control disk 120 by the lower pawl 274 causes one of the control valve ports in the port insert 122 to be pressurized by virtue of being uncovered by a depending surface 281, thus initiating regeneration.

When the control valve 140 (shown in FIG. 2) is open, a fluid stream is directed to the regeneration turbine 142 (shown in FIG. 3) located in the turbine chamber 143. The turbine 142 is mechanically coupled to a regeneration drive pawl 284 through a reduction gear train 285 (shown in FIG. 3). The pawl is journalled on an eccentric shaft 286. Rotation of the turbine 142 thus effects incremental rotation of the regeneration control disk 120 and in so doing, effects a regeneration cycle. The regeneration cycle continues until the control port communicating with the control valve chamber 146 via signal line K (shown in FIG. 2) is depressurized thus closing the control valve 140.

During the regeneration cycle, treated water is communicated to the venturi 260a. The flow of water through the venturi draws regeneration solution from the regeneration source 15 via conduit 220.

In a water softening application, the regeneration source 15 typically includes a brine well and brine control valve (not shown). When a predetermined amount of regeneration solution is drawn from the source 15, the brine valve (not shown) closes. The flow of treated water (in this example softened water continues to flow into the regenerated tank for a predetermined amount of time to effect a counterflow rinse. After a predetermined amount of time, the flow of softened water into the tank being regenerated is terminated by depressurizing the appropriate drain piston chamber 150, 152.

Referring in particular to FIGS. 2-4, the process steps will now be discussed in greater detail. As indicated above, a regeneration cycle is initiated when the depending surface 281 uncovers one of the ports communicating with the control valve 140. As seen in FIG. 2, two control valve ports, separated by 180°, are defined in the insert 122. It should be apparent, the regeneration control disk 120 rotates through an arc of 180.degree. during a regeneration cycle. For purposes of explanation, suppose that tank 10 requires regeneration. Referring to FIGS. 2-4, the ports, defined in the insert 122, to the left of the diametral line 268, control the regeneration of tank 10. Movement of the regeneration control disk 120 is initiated by the pawl assembly 270 as explained above. The initial movement in the disk 120 by the pawl 270 causes the depending surface 281 to uncover the control valve 140.

The water treatment unit then goes through several process steps to complete the regeneration cycle. Initially the regeneration solution is passed through the tank being regenerated in a counter-flow direction. This is followed by a slow rinse which is also in the counter-flow direction. More specifically, in the slow rinse step, treated water (i.e. softened water if the unit is a water softener) from the collection chamber 110 is injected into the outlet of the tank being regenerated, travels down the associated riser tube 107 or 109 and then is discharged through the inlet conduit into the drain chamber. From the above description of the invention, those skilled in the art will perceive improvements, changes and modifications.

Although the invention has been described with a certain degree of particularity, it should be understood that those skilled in the art can make various changes to it without departing from the spirit or scope of the invention, as hereinafter claimed.

Having described the invention, we claim:

1. A control valve assembly for a water treatment system having at least one treatment tank that requires periodic regeneration and the control valve assembly, having a multi-level valve housing, comprising:
   a) a stationary port disc located in a sealed chamber located in said valve housing, said port disc defining signal ports;
   b) a regeneration control disc rotatable in a rotational plane atop said port disc such that rotation of said regeneration control disc selectively communicates said signal ports with pressurized water or a drain, said rotatable regeneration control disc biased into sealing engagement with said port disc;
c) an encoder wheel operatively coupled to said regeneration control disc, said encoder wheel monitoring a rotation and position of said regeneration control disc;
d) a sensor for monitoring movement in said encoder wheel;
f) an electric drive motor operatively coupled to said regeneration control disc so that energization of said electric motor produces attendant rotation in said regeneration control disc;
g) a water usage turbine for monitoring a quantity of water treated by a water treatment system;
h) a sensor for monitoring rotation of said usage turbine and operative to produce signals in response to rotation of said water usage turbine;
i) a regeneration controller electronically coupled to said drive motor and operative to receive signals from said water usage turbine sensor and using said signals from said water usage turbine sensor to determine when regeneration of a tank forming part of said water treatment system requires regeneration and further operative to control energization of said electric motor to cause rotation of said regeneration control disc in order to effect a regeneration cycle.

2. The control valve assembly of claim 1 wherein said electric motor is disposed within a dry chamber, said dry chamber located below a rotational plane defined by said regeneration control disc.

3. The control valve assembly of claim 1 wherein said drive motor is located in a housing portion located above a rotational plane defined by said regeneration control disc.

4. The control valve assembly of claim 1 wherein said electric motor is coupled to said regeneration control disc through a pinion and pinion shaft assembly which includes a tapered bushing clutch that interconnects shaft portions forming part of pinion shaft assembly and configured such that applying pressure to one shaft portion of said pinion shaft assembly produces a separating movement in said tapered pushing clutch, allowing relative rotation between said shaft portions; and further comprising an externally accessible actuator which produces said separating movement between said shaft portions when said actuator member is pressed and said actuator member is engageable with said regeneration control disc, when pressed, so that rotation of said actuator produces rotation in said regeneration control disc.

5. The control valve assembly of claim 1 wherein said valve housing comprises a valve housing having a regeneration turbine chamber, said turbine chamber in said valve housing being modified to isolate said turbine chamber from a source of water in said valve, thus creating a dry chamber for mounting said drive motor.

6. The control valve assembly of claim 1 wherein said drive motor is a gear motor.

7. The control valve assembly of claim 1 wherein said sensor for said encoder wheel is an optical sensor.

8. The control valve assembly of claim 1 wherein said sensor for monitoring rotation of said usage turbine is a hall effect sensor.

9. The control valve assembly of claim 1 wherein at least a portion of said regeneration controller is located remotely from said control valve assembly and is electronically coupled to said control valve assembly in order to effect control of said electric drive motor.

10. A method for adapting a water treatment control valve assembly to have an electronically controlled regeneration function, the water treatment control valve assembly having a water pressure operated servo control system for regenerating an exhausted water treatment tank, a regeneration turbine chamber enclosing a regeneration drive turbine receiving fluid from a nozzle and operatively coupled to a regeneration control disc, the servo-control system including a port disc defining ports for communicating fluid signals to valve components contained within the control valve assembly comprising the steps of:
a) isolating said regeneration turbine chamber from sources of water, thus creating a dry chamber;
b) rotatably mounting a regeneration control disc in a servo control chamber and in abutting engagement with said port disc;
c) biasing said regeneration control disc for sealing engagement with said port disc;
d) coupling said regeneration control disc with an encoder wheel located in an encoder chamber;
e) rotatably mounting a water usage turbine in said valve housing that rotates in response to water treated by said treatment tank;
f) locating a sensor in sensing proximity to said water usage turbine to thereby sense rotation of said water usage turbine;
g) communicating signals from said water usage turbine sensor to a controller, said controller using said signals to determine when regeneration is needed, based on the amount of water treated by said tank;
h) mounting an electric drive motor in said regeneration turbine chamber and operatively coupling said motor to said regeneration control disc, whereby reenergization of said drive motor rotates said regeneration control disc;
i) electronically coupling said regeneration control disc to said drive motor and in conjunction with said encoder wheel, rotationally stepping said regeneration control disc through a regeneration cycle in order to regenerate an exhausted tank.

11. The method of claim 10 wherein a drain passage forming part of the control valve assembly is rerouted in order to eliminate water from said regeneration turbine chamber and further comprises a step of disabling said nozzle to eliminate a discharge opening in the existing nozzle of said control valve assembly.

12. A water treatment system comprising:
a) at least one treatment tank that requires periodic regeneration;
b) a control valve assembly for controlling regeneration of said at least one treatment tank when it is exhausted, said control valve assembly including:
(i) a valve housing, said valve housing including a regeneration turbine chamber in which a regeneration turbine and associated nozzle are located, said regeneration turbine operative under predetermined conditions to produce rotation in a regeneration control disc;
ii) a stationary port disc having a planar surface defining ports for communicating fluid signals to fluid control valves contained within said valve housing;
iii) a regeneration control disc rotatable and abutably engaging said port disc, said regeneration control disc biased toward sealing engagement with said planar surface of said port disc;

c) an encoder wheel operatively connected to said regeneration control disc, such that rotation of said regeneration control disc produces rotation in said encoder wheel;
d) an encoder sensor for monitoring movement in said encoder wheel, thereby monitoring a position of said regeneration control disc;
e) an electric drive motor located in said regeneration turbine chamber, said drive motor operatively coupled to said regeneration control disc, such that energization of said electric motor produces rotation in said regeneration control disc; and
g) a water usage turbine rotationally mounted within said valve housing and further including a turbine sensor for detecting rotation of said water usage turbine, said sensor sending signals to a regeneration controller related to said water usage turbine rotation whereby an amount of water treated by said water treatment system is determined;
said controller operative to energize said electric motor under predetermined operating conditions whereby an exhausted tank of said water treatment system is stepped through a regenerating cycle.

13. The water treatment system of claim 12 wherein said control valve assembly includes an externally accessible actuator for decoupling said electric motor from said regeneration control disc and further operative to engage said regenerating control disc such that rotation of said actuator produces rotation in said regeneration control disc.

14. The water treatment system of claim 12 wherein said encoder wheel sensor is an optical sensor and the water usage turbine sensor is a hall effect sensor.

15. The water treatment system of claim 12 wherein said water usage turbine forms part of an assembly that includes a turbine and at least one magnet attached to said turbine and said turbine sensor detects motion by said magnet.

16. The water treatment system of claim 15 wherein said magnet is a ring magnet and said turbine includes a plurality of spring loaded fingers which engage said ring magnet.

17. The water treatment system of claim 16 wherein said ring magnet includes a center opening defining a flat that is engageable with corresponding structure on said turbine to inhibit relative rotation between said magnet and said turbine when said magnet is mounted on said turbine.

18. A control system for a water treatment system having at least one treatment tank that requires a periodic regeneration, the control system comprising:
   a) a control valve assembly having multi-level valve housing, comprising;
      i) a stationary port disc located in a sealed chamber located in said valve housing, said port disc defining signal ports;
      ii) regeneration control disc rotatable in a rotational plane atop said port disc such that rotation of said regeneration control disc selectively communicates said signal ports with pressurized water or a drain, said rotatable regeneration control disc biased into sealing engagement with said port disc;
      iii) an encoder wheel operatively coupled to said regeneration control disc, said encoder wheel monitoring a rotation and position of said regeneration control disc;
      iv) a sensor for monitoring movement in said encoder wheel;
      v) an electric drive motor operatively coupled to said regeneration control disc so that energization of said electric motor produces attendant rotation in said regeneration control disc;
      vi) a water usage turbine for monitoring a quantity of water treated by said water treatment system; and
      vii) a sensor for monitoring rotation of said usage turbine and operative to produce signals in response to rotation of said water usage turbine.
   b) a regeneration controller electronically coupled to said drive motor and operative to receive signals from said water usage turbine sensor and using said signals from said water usage turbine sensor to determine when regeneration of a tank forming part of said water treatment system requires regeneration and further operative to control energization of said electric motor to cause rotation of said regeneration control disc in order to effect a regeneration cycle.

19. The control system of claim 18 wherein said regeneration controller is remotely mounted and is connected to said control valve assembly by an electronic cable.

20. The control system of claim 18 wherein said controller is mounted within a dry chamber in said valve housing.

21. The control system of claim 18 wherein said regeneration controller is remotely mounted and is electronically connected to said control valve assembly by a wireless connection.

22. The control system of claim 21 wherein said wireless connection is a Bluetooth or Wi-Fi connection.

23. The control system of claim 18 wherein said regeneration controller is wirelessly connected to another device by which said device can remotely program said regeneration controller, download data from said regeneration controller, monitor said regeneration controller, remotely adjust said regeneration controller or remotely operate said control valve assembly.

24. The control valve assembly of claim 9 wherein said regeneration control portion is electronically coupled to said control valve assembly with a wireless connection.

25. The control valve assembly of claim 9 wherein said regeneration controller is wirelessly connected to a remote device by which said remote device can remotely adjust said controller, download data from said controller, remotely program said controller, receive data from said controller or remotely operate said control valve assembly.

* * * * *